United States Patent
Mao et al.

(10) Patent No.: US 8,874,769 B2
(45) Date of Patent: Oct. 28, 2014

(54) FACILITATING GROUP ACCESS CONTROL TO DATA OBJECTS IN PEER-TO-PEER OVERLAY NETWORKS

(75) Inventors: Yinian Mao, San Diego, CA (US); Vidya Narayanan, San Diego, CA (US); Ashwin Swaminathan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 413 days.

(21) Appl. No.: 13/174,532

(22) Filed: Jun. 30, 2011

(65) Prior Publication Data

US 2013/0007442 A1   Jan. 3, 2013

(51) Int. Cl.
  *G06F 15/16* (2006.01)
  *H04L 9/32* (2006.01)
  *H04L 29/06* (2006.01)
  *H04L 29/08* (2006.01)

(52) U.S. Cl.
  CPC .......... *H04L 67/1044* (2013.01); *H04L 63/104* (2013.01); *H04L 63/0823* (2013.01)
  USPC .......................................... 709/229; 713/168

(58) Field of Classification Search
  CPC .. H04I 67/104; H04I 67/1044; H04I 67/1046; H04I 67/1048; H04I 67/1051; H04I 67/1053; H04L 63/061; H04L 63/205; G06F 21/30
  USPC ............... 713/168, 156; 726/27, 29; 370/219, 370/328, 338; 709/249, 204, 228, 229, 246; 707/102
  See application file for complete search history.

(56) References Cited

U.S. PATENT DOCUMENTS 6,754,829 B1   6/2004   Butt et al.
7,397,922 B2   7/2008   Gavrilescu et al.
(Continued)

FOREIGN PATENT DOCUMENTS

JP   2006180228   7/2006

OTHER PUBLICATIONS

Djordjevic et al.,"Dynamic security perimeters for inter-enterprise service integration", Future Generations Computer Systems, Elsevier Science Publishers. Amsterdam,NL, vol. 23, No. 4, Feb. 2, 2007, pp. 633-657, XP005871920, ISSN: 0167-739X, DOI: 10.1016/J.Future.2006.09.009 paragraphs [03.2], [03.3].

(Continued)

*Primary Examiner* — Michael R Vaughan
*Assistant Examiner* — Abdullah Almamun
(74) *Attorney, Agent, or Firm* — Won Tae Kim

(57) ABSTRACT

Methods and apparatuses are provided for facilitating group access controls in peer-to-peer or other similar overlay networks. A group administrator may create a group in the overlay network and may assign peer-specific certificates to each member of the group for indicating membership in the group. A group member peer node can access data objects in the overlay network using its respective peer-specific certificate to authenticate itself as a group member. The authentication is performed by another peer node in the network. The validating peer node can authenticate that the group member is the rightful possessor of the peer-specific certificate using a public key associated with the peer node to which the peer-specific certificate was issued. The validating peer node can also validate that the peer-specific certificate was properly issued to the group member using a public key of the apparatus that issued the peer-specific certificate.

39 Claims, 13 Drawing Sheets

(56) References Cited

U.S. PATENT DOCUMENTS

| | | | |
|---|---|---|---|
| 7,478,120 B1* | 1/2009 | Zhang | 709/201 |
| 7,860,243 B2 | 12/2010 | Zheng et al. | |
| 8,108,455 B2* | 1/2012 | Yeager et al. | 709/202 |
| 8,281,023 B2* | 10/2012 | Dondeti et al. | 709/229 |
| 2003/0056093 A1* | 3/2003 | Huitema et al. | 713/156 |
| 2003/0070070 A1* | 4/2003 | Yeager et al. | 713/157 |
| 2004/0260701 A1 | 12/2004 | Lehikoinen et al. | |
| 2005/0063563 A1 | 3/2005 | Soliman | |
| 2005/0177715 A1 | 8/2005 | Somin et al. | |
| 2006/0105741 A1* | 5/2006 | Suh et al. | 455/410 |
| 2007/0266251 A1 | 11/2007 | Busser et al. | |
| 2008/0072037 A1* | 3/2008 | Narayanan et al. | 713/156 |
| 2009/0006849 A1* | 1/2009 | Gupta et al. | 713/168 |
| 2009/0125721 A1* | 5/2009 | Numaoka | 713/175 |
| 2009/0210484 A1* | 8/2009 | Schneider | 709/203 |
| 2010/0030900 A1* | 2/2010 | Manion et al. | 709/227 |
| 2010/0106972 A1* | 4/2010 | Melen et al. | 713/171 |

OTHER PUBLICATIONS

International Search Report and Written Opinion—PCT/US2012/045060—ISA/EPO—Nov. 6, 2012.

* cited by examiner

US 8,874,769 B2

FACILITATING GROUP ACCESS CONTROL TO DATA OBJECTS IN PEER-TO-PEER OVERLAY NETWORKS

BACKGROUND

1. Field

Various features disclosed herein pertain generally to peer-to-peer overlay networks, and at least some features pertain to devices and methods for facilitating group access control to data objects in peer-to-peer overlay networks.

2. Background

Peer-to-peer (or p2p) and other similar overlay networks include a distributed application architecture that partitions tasks or workloads between peers. Such peer-to-peer overlay networks can be built on top of an underlying network, such as a network utilizing the Internet Protocol (IP).

Typically, peers are equally privileged, equipotent participants in the application, and are typically said to form a peer-to-peer network of nodes. The various peer nodes cooperate with each other both to provide services and to maintain the network. Peer nodes typically make a portion of their resources, such as processing power, disk storage or network bandwidth, directly available to other network participants, without the need for central coordination by servers or stable hosts. Generally speaking, the peer nodes are both suppliers and consumers of resources, in contrast to the traditional client-server model where only servers supply, and clients consume.

Peer-to-peer and similar overlay networks can be employed in many environments for low-cost scalability and easy deployment of applications. Typically, such networks are relatively open, allowing devices (i.e., nodes) to join and leave at will. In some implementations of such a network, a user's data can be stored in a distributed fashion on a remote node in the network, which might be known or unknown to the user. As a result some users may not have full confidence in the overlay's data storage capability unless there are assurances that the user's data will not be accessed (e.g., read and/or modified) in unauthorized fashion. The data owner may, therefore, be able to specify access controls defining who can access the stored data objects.

Conventionally, each data object stored in a peer-to-peer overlay network has a respective access control list indicating the access control policy for that particular data object. For example, the respective access control list may indicate which users or groups of users have a specified type of access to the data object. However, providing efficient group-based access control can be challenging in a peer-to-peer overlay network in which there may or may not be any central authority to enforce access control based on group membership. For example, without a central authority, it may be difficult to authenticate peer nodes as valid group members. Therefore, there is a need for systems, devices and/or methods for managing and authenticating group membership among peer nodes in a peer-to-peer overlay network.

SUMMARY

Various features provide peer nodes for facilitating group-based access control in a peer-to-peer overlay network. One or more features provide group administrator peer nodes, which may include a communications interface and a storage medium, each coupled to a processing circuit. The communications interface may be adapted to facilitate communications on a peer-to-peer overlay network. The storage medium may include a private and public key pair associated with the group administrator peer node.

According to various implementations, the processing circuit may be adapted to create a peer group, which defines one or more peer nodes as members of the group. The processing circuit may further assign a peer-specific certificate to a group member peer node that is a member of the group, the peer-specific certificate adapted to authenticate membership in the group to other peer nodes in the peer-to-peer overlay network and including a group identity, an identity of the group member peer node, an identity of an issuing apparatus and a signature by a private key of the issuing apparatus over one or more components of the peer-specific certificate.

Methods operational in a group administrator peer node are also provided. According to one or more implementations of such methods, a public and private key pair associated with the group administrator peer node may be obtained. A peer group may be created in a peer-to-peer overlay network, where the group defines one or more peer nodes that are members of the group. A peer-specific certificate may be assigned to a group member peer node that is a member of the group, where the peer-specific certificate is adapted to authenticate membership in the group to other peer nodes in the peer-to-peer overlay network. The peer-specific certificate may include a group identity, an identity of the group member peer node, an identity of an issuing apparatus and a signature by a private key of the issuing apparatus over one or more components of the peer-specific certificate.

At least one other feature provides group member peer nodes, which may include a communications interface and a storage medium, each coupled to a processing circuit. The communications interface may be adapted to facilitate communication on a peer-to-peer overlay network. The storage medium may include a private key and a public key pair associated with the group member peer node.

According to various implementations, the processing circuit may be adapted to receive a peer-specific group certificate via the communications interface. The peer-specific group certificate may be issued to the group member peer node from a group administrator peer node, and may include a group identity, an identity of the group member peer node, an identity of the group administrator peer node and a signature by a private key of the group administrator peer node over one or more components of the peer-specific group certificate. The processing circuit may further send the peer-specific group certificate to a validating peer node via the communications interface. The processing circuit may also send authentication data to the validating peer node via the communications interface. The authentication data may be signed using the private key associated with the group member peer node.

Methods operational in a group member peer node are also provided. According to one or more implementations of such methods, a public and private key pair associated with the group member peer node may be obtained. A peer-specific group certificate issued to the group member peer node from a group administrator peer node may be received. The peer-specific group certificate may include a group identity, an identity of the group member peer node, an identity of the group administrator peer node and a signature by a private key of the group administrator peer node over one or more components of the peer-specific group certificate. The peer-specific group certificate may be sent to a validating peer node to authenticate the group member peer node as a group member, where the peer-specific group certificate is adapted to be authenticated by the validating peer node. Authentication data may also be sent to the validating peer node, where the authentication data is signed using the private key associated with the group member peer node.

Additional features provide validating peer nodes, which may comprise a communications interface adapted to facilitate communication on a peer-to-peer overlay network, and a processing circuit coupled to the communications interface. According to various implementations, the processing circuit may be adapted to receive via the communications interface a peer-specific group certificate from a group member peer node seeking authentication as a member of a group. The peer-specific group certificate may include a group identity, an identity of the group member peer node, an identity of a group administrator peer node and a signature by a private key of the group administrator peer node over one or more components of the peer-specific group certificate. The processing circuit may obtain a group token from the peer-to-peer overlay network. The group token may include a signature by the private key of the group administrator peer node, and may be stored in the peer-to-peer overlay network as a data object identified by the group identity. The processing circuit may verify the signature of the group token using the public key of the group administrator peer node to validate that the group administrator peer node was authorized to issue the peer-specific group certificate, and may verify the peer-specific group certificate using a public key associated with the group administrator peer node.

Methods operational in a validating peer node are also provided. According to one or more implementations of such methods, a peer-specific group certificate may be received from a group member peer node seeking authentication as a member of a group. The peer-specific group certificate may include a group identity, an identity of the group member peer node, an identity of a group administrator peer node and a signature by a private key of the group administrator peer node over one or more components of the peer-specific group certificate. A group token may be obtained from the peer-to-peer overlay network. The group token may include a signature by the private key of the group administrator peer node, and may be stored in the peer-to-peer overlay network as a data object identified by the group identity. The signature of the group token may be verified using the public key of the group administrator peer node to validate that the group administrator peer node was authorized to issue the peer-specific group certificate, and the peer-specific group certificate may be verified using a public key associated with the group administrator peer node.

DETAILED DESCRIPTION

Figure 1:
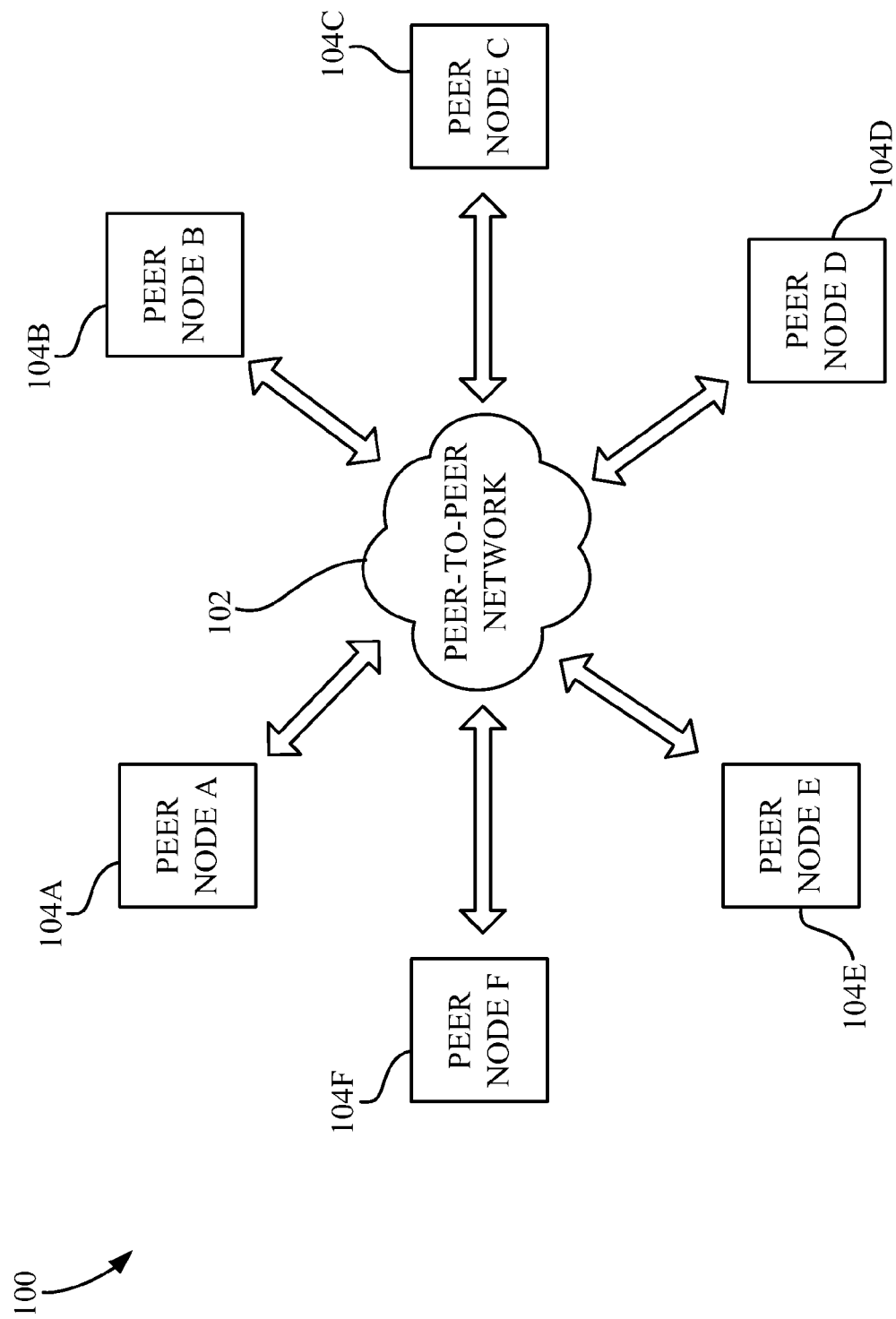
FIG. 1 is a block diagram illustrating a network comprising a peer-to-peer overlay network in which data objects may be stored among nodes of the overlay network.

In the following description, specific details are given to provide a thorough understanding of the described implementations. However, it will be understood by one of ordinary skill in the art that various implementations may be practiced without these specific details. For example, circuits may be shown in block diagrams in order not to obscure the implementations in unnecessary detail. In other instances, well-known circuits, structures and techniques may be shown in detail in order not to obscure the described implementations.

The word "exemplary" is used herein to mean "serving as an example, instance, or illustration." Any implementation or embodiment described herein as "exemplary" is not necessarily to be construed as preferred or advantageous over other embodiments or implementations. Likewise, the term "embodiments" does not require that all embodiments include the discussed feature, advantage or mode of operation. The terms "peer-to-peer overlay network" and "peer node" as used herein are meant to be interpreted broadly. For example, a "peer-to-peer overlay network" may refer to an overlay network that is not centrally coordinated by servers or stable hosts and that includes a distributed application architecture that partitions tasks or workloads between peers. Furthermore, a "peer node" may refer to a device that facilitates communication on a peer-to-peer overlay network. Examples of "peer nodes" may include printers, tablet computers, televisions, mobile phones, personal digital assistants, personal media players, laptop computers, notebook computers, desktop computers, etc.

Overview

One feature facilitates group access controls within a peer-to-peer overlay network. A group can be formed by a user in a peer-to-peer overlay network. The group is given a group name by which it is identified in the peer-to-peer overlay network and which may be unique from other groups and/or data objects in the peer-to-peer overlay network. A group administrator, which may be the peer node or user who created the group, can manage the group's membership. The group administrator may assign a peer-specific certificate to each group member. In some implementations, the group administrator can assign the peer-specific certificates by issuing the certificate itself. In other implementations, the group administrator can request a trusted authority to issue the peer-specific certificate for each group member.

According to a feature, each group member with a peer-specific certificate can use the certificate to authenticate itself as a valid member of the group. Such authentication procedures can be distributed among peer nodes in the overlay network. For instance, a validating peer node can receive the peer-specific certificate from a group member and can validate the group member to authenticate that the group member is the rightful possessor of the certificate. The validating peer node uses a public key of the node to which the certificate was issued, which public key is either included in the certificate or can be located from an identity of the peer node associated with the public key included in the certificate, to validate the group member. In addition, the validating peer node can also validate the certificate itself using a public key of the apparatus that issued the certificate to authenticate that the peer-specific group certificate was properly issued.

Exemplary Network Environments

FIG. 1 is a block diagram illustrating a network 100 comprising an overlay network that is not centrally coordinated by servers or stable hosts in which data objects may be stored among nodes of the overlay network. The overlay network may comprise a peer-to-peer overlay network 102. Such a peer-to-peer overlay network 102 may utilize any type of underlying network, such as an Internet Protocol network, to allow a plurality of peer nodes 104A-104F on the overlay network 102 to communicate with each other. The underlying network may comprise any number of types of network, such as Wide Area Networks (WAN), Local Area Networks (LAN), wireless networks (e.g., WWAN, WLAN) and/or any other type of network.

Peer nodes 104A-104F can include any device adapted to communicate via the peer-to-peer overlay network 102. Such devices may include a middleware layer adapted to facilitate communications via the peer-to-peer overlay network 102. By way of example and not limitation, peer nodes 104A-104F can include devices such as printers, tablet computers, televisions, mobile phones, personal digital assistants, personal media players, laptop and notebook computers and/or desktop computers, as well as other devices.

According to one or more implementations described herein, each peer node 104A-104F is provided with a private key and public key pair. The private key is kept secret by the respective peer node 104A-104F, and only known to itself. The public key can be distributed to other peer nodes. Each peer node 104A-104F further obtains a node certificate from a trusted authority (e.g., an Enrollment Server). Each node certificate can include the respective peer node's identity and/or a user identity, the peer node's public key, the identity of the trusted authority issuing the node certificate, and a signature by the trusted authority. The trusted authority's public key can be distributed to each of the peer nodes 104A-104F for verification of the certificate signed by the trusted authority.

Figure 2:
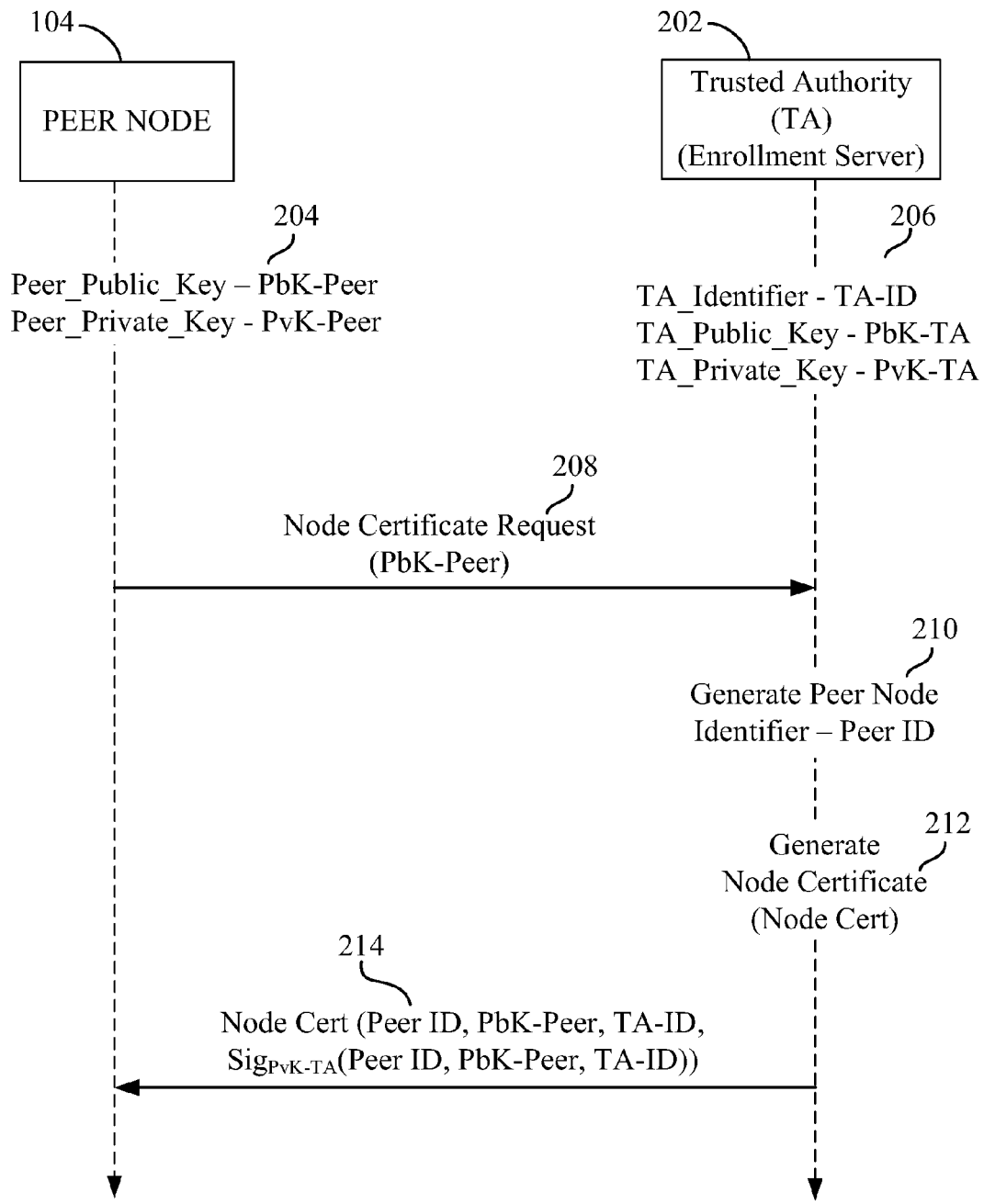
FIG. 2 is a flow diagram illustrating a process for providing a node certificate from a trusted authority to a peer node of a peer-to-peer overlay network according to at least one example.

FIG. 2 is a flow diagram illustrating at least one example of a process for providing a node certificate from a trusted authority 202 to a peer node 104 (e.g., any of peer nodes 104A-104F of FIG. 1). A peer node 104 or its user that joins a peer-to-peer overlay network (e.g., peer-to-peer overlay network 102 in FIG. 1) may be provided with a unique key pair including a public key (PbK-Peer) and private key (PvK-Peer), as shown at 204. In other implementations, such a key pair may be issued by the trusted authority 202. A trusted authority 202, such as an Enrollment Server, has an identity (TA-ID) and also has a unique private and public key pair (PvK-TA, PbK-TA), as shown at 206.

The peer node 104 may send a transmission 208 to the trusted authority 202 requesting a node certificate. The transmission may include the peer node's public key (PbK-Peer) if the peer node 104 was previously provided with the public key (PbK-Peer). Upon receipt of the request, the trusted authority 202 generates a peer identity (Peer ID) 210. As used herein, a peer identity can comprise an identity of a peer device and/or an identity of a user of the peer device. The trusted authority 202 can then generate a node certificate (Node Cert) 212 for the peer node 104, and sends 214 the node certificate to the peer node 104. The node certificate includes the peer identity (Peer ID) for the peer node 104, the peer node's public key (PbK-Peer), the trusted authority's identity (TA-ID) and a signature by the private key of the trusted authority ($Sig_{PvK-TA}$). According to various implementations, the signature by the private key of the trusted authority ($Sig_{PvK-TA}$) can comprise a signature of the entire node certificate (as shown), or of one or more of the individual data pieces (or components) included in the node certificate. The public key (PbK-TA) for the trusted authority 202 can be distributed to each peer node on the peer-to-peer overlay network for verification of node certificates.

The node certificate can accordingly be employed in authenticating the peer node 104. For example, a validating peer node can receive the node certificate from the peer node 104. Using the public key (PbK-Peer) of the peer node 104 included in the certificate, the validating peer node can perform a challenge response to verify that the peer node 104 is the true owner of the node certificate. Additionally, the validating peer node can use the identity of trusted authority (TA-ID) to retrieve the trusted authority's 202 public key. Using the trusted authority's 202 public key, the validating peer node can also validate the signature ($Sig_{PvK-TA}$) of the node certificate, which indicates that the node certificate was issued by the trusted authority 202.

Referring again to FIG. 1, each of the peer nodes 104A-104F are able to communicate with other peer nodes 104A-104F via the peer-to-peer overlay network 102, without the need for central coordination by servers or stable hosts. For example, each of the peer nodes 104A-104F can make a portion of their resources (e.g., processing power, disk storage, network bandwidth) available to another peer node, and can utilize a portion of another peer node's resources without a server or stable host for central coordination. In at least some implementations, at least some of the peer nodes 104A-104F may store a data object in the peer-to-peer overlay network 102. When a data object is stored in the peer-to-peer overlay network 102, an identifier associated with the data object is employed to locate the data object within the peer-to-peer overlay network when access to the data object is desired. The data object is then stored within the peer-to-peer overlay network 102 by storing the data object at one of the other peer nodes 104A-104F.

The owner of a data object can specify access controls for the data object that is stored in the peer-to-peer network overlay 102. For example, peer node 104A and/or its user can specify a group of peer nodes and/or a group of users who are authorized to access the data object that it has stored in the peer-to-peer overlay network 102. Such a group of authorized peer nodes and/or users may be referred to generally herein as a group.

Facilitating Group Management and Member Authentication

Figure 3:
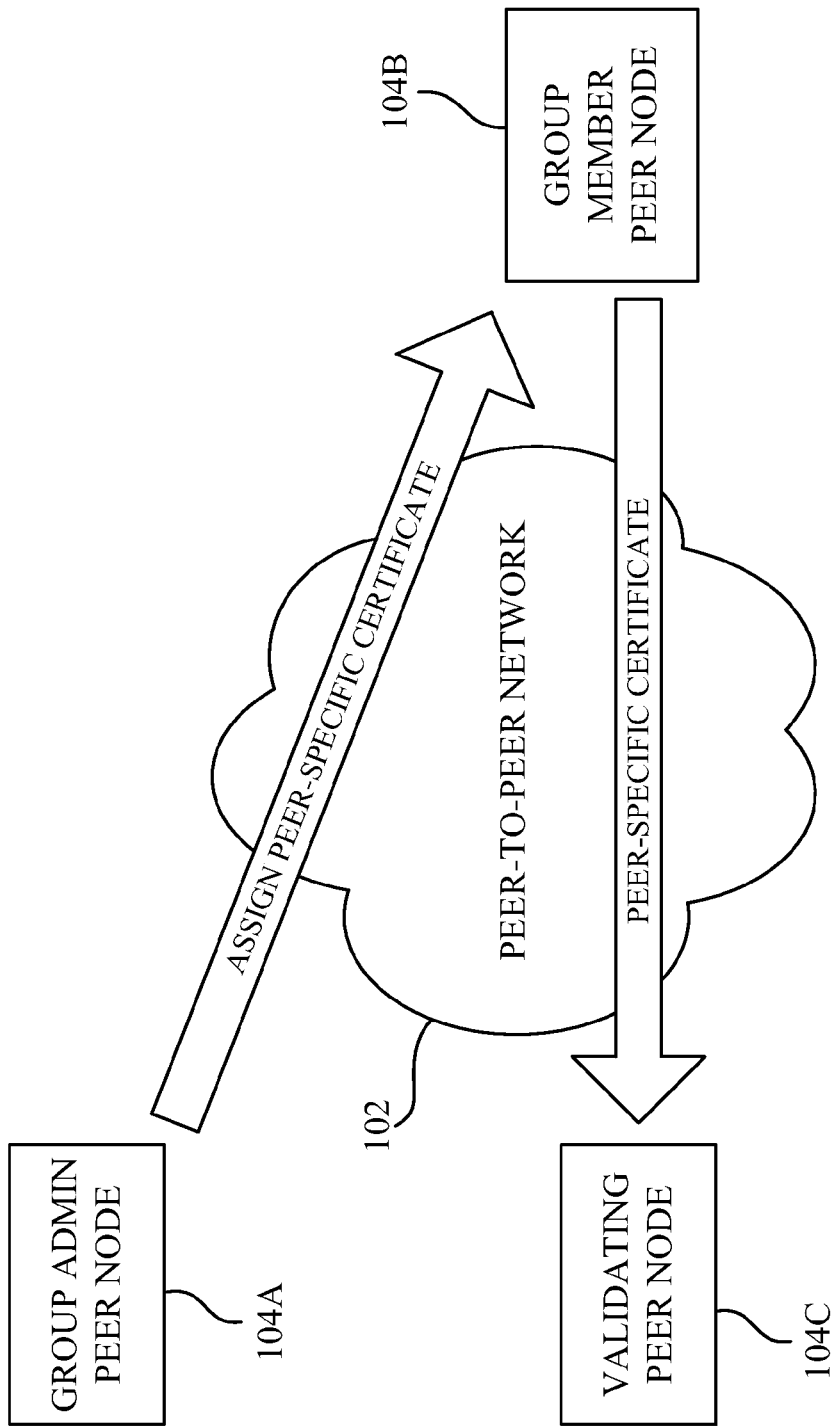
FIG. 3 is a block diagram illustrating a network environment for facilitating group management and member authentication for an overlay network that is not centrally coordinated by servers or stable hosts.

Turning to FIG. 3, a network environment for facilitating group management and member authentication is shown for an overlay network that is not centrally coordinated by servers or stable hosts. In this example, the peer nodes 104A-104C from FIG. 1 are used for illustration purposes. When the peer node 104A and/or its user specifies (or creates) a group, that peer node 104A and/or its user may manage the group's membership in the peer-to-peer overlay network 102, and may be referred to herein as a group administrator. As used throughout this disclosure reference to a group administrator peer node (e.g. group administrator peer node 104A) refers to the peer node device and/or its user. According to a feature, the group administrator peer node 104A can assign a peer-specific certificate to each peer node 104 and/or user that is a member of the group. In some implementations, the peer-specific certificate can comprise a peer-specific group certificate that is issued by the group administrator peer node 104A. In other implementations, the peer-specific certificate can comprise a peer-specific node certificate that is issued by the trusted authority to each group member, after authorization from the group administrator peer node 104A.

A peer node and/or a user that is a member of the group (e.g., peer node 104B) may subsequently request access to the stored data object via the peer-to-peer overlay network 102. As used herein, an access request may comprise a request for one of various levels of access, including but not limited to, read access or reading/modifying access (i.e., read/write access). A peer node and/or user that is a member of a group and that requests access to the data object may be referred to herein as a group member peer node (e.g., group member peer node 104B) or an accessing peer node. The access controls may specify that members of the group are allowed certain access, but it is desirable to validate that the group member peer node 104B truly is a member of the group.

According to a feature, enforcement of the group access controls can be distributed among the peer nodes in the overlay network. For instance, a peer node may be employed to validate that the group member peer node 104B is actually a member of the group, as asserted by the group member peer node 104B. Such a peer node that authenticates or validates the group membership of the group member peer node 104B may be referred to herein as a validating peer node 104C. According to one or more implementations, the group member peer node 104B can send its peer-specific certificate (e.g., peer-specific group certificate, peer-specific node certificate) to the validating peer node 104C. The validating peer node 104C can then validate the group member peer node 104B using a public key that is either included in the peer-specific certificate, or is located from other information included in the peer-specific certificate (e.g., the group member peer node's 104B identity) The validating peer node 104C can also validate the peer-specific certificate using a public key of the apparatus that issued the certificate (e.g., the group administrator peer node in the case of a peer-specific group certificate, the trusted authority in the case of a peer-specific node certificate). According to a feature, the validating peer node 104C is able to independently validate that the group member peer node 104B is a member of a group. That is, the validating peer node 104C can autonomously validate the group membership of the group member peer node 104B without employing another peer node or a central server to provide validation information or to perform one or more of the validating functions.

It should be noted that although the group administrator peer node 104A, the group member peer node 104B and the validating peer node 104C are depicted as distinct peer nodes according to the implementation illustrated, a peer node can perform the rolls of a plurality of the depicted peer nodes in various implementations. For example, the group administrator peer node 104A may also be a group member peer node 104B that requests access to a data object and is validated by a validating peer node 104C. In another example, the group administrator peer node 104A may be employed to validate a group member peer node 104B that is requesting access to a data object, in which case the group administrator peer node 104A would also be a validating peer node 104C. In yet another example, a group member peer node 104B may also operate as a validating peer node 104C when employed to validate another group member peer node.

Figure 4A:
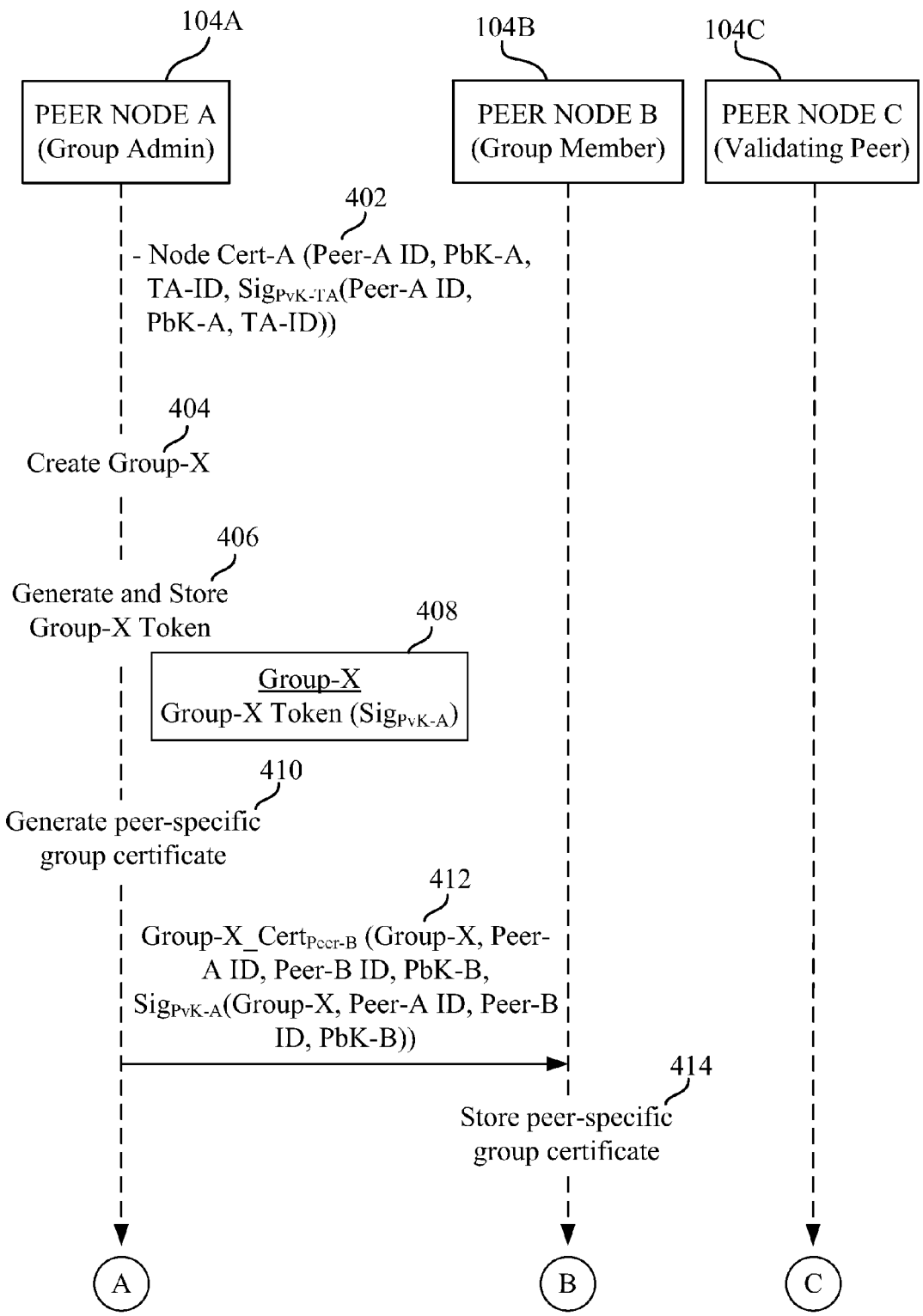
FIG. 4 (comprising FIGS. 4A and 4B) is a flow diagram illustrating group management and member authentication according to at least one implementation employing peer-specific group certificates for group-member peer nodes.
Figure 4B:
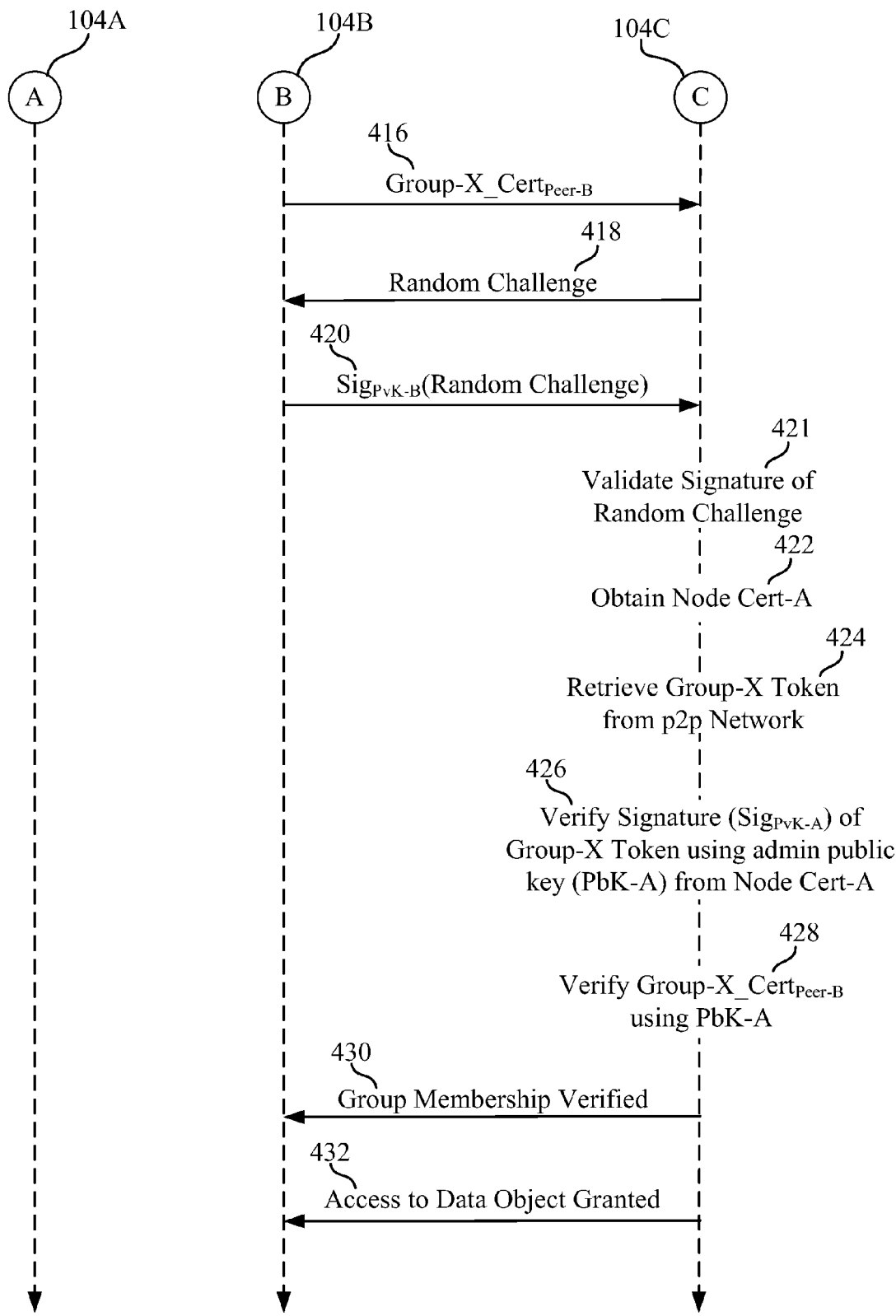

FIGS. 4 and 5 are flow diagrams illustrating some examples of group management and member authentication according to various implementations of the present disclosure. Turning first to FIG. 4 (including FIGS. 4A and 4B), a flow diagram is shown illustrating group management and member authentication according to at least one implementation employing peer-specific group certificates for group-member peer nodes. In this example, the group administrator peer node 104A, the group member peer node 104B, and the validating peer node 104C described with reference to FIG. 1 are used for illustration purposes.

Initially, the group administrator peer node A 104A, can obtain a node certificate (Node Cert-A) 402 from a trusted authority (e.g., trusted authority 202 in FIG. 2). The node certificate 402 includes the peer node A's identity (Peer-A ID), peer node A's public key (PbK-A), the trusted authority's identity (TA-ID), and a signature by the trusted authority, and may be obtained in a manner similar to that described above with reference to FIG. 2.

At 404, the peer node A 104A can create a group and give the group a name (e.g., group X). The group name is a unique name used to identify the group. In order to ensure the group name is unique, the peer node A 104A can generate a group token and can store the group token under the group name in the peer-to-peer overlay network 406. The group token (shown as group token 408 in FIG. 4A) can be stored using a single-value model in which there can be only one data object stored in the peer-to-peer overlay network under any particular name. Accordingly, if another data object or group is already using the group name as an identifier, then the group token 408 using the repeated name would be routed by the peer-to-peer overlay network to the same storing peer node as the other similarly named object, resulting in a name collision at the storing peer node. When such a collision occurs, the group administrator peer node A 104A can be informed that a different group name is to be chosen. When no name collision occurs, the group administrator peer node A 104A can be assured that the selected group name is unique.

The group token 408 can include a description of the group (e.g. Group-X), the identity of the group administrator, the identities of the members of the group and/or other information. The group token can also include a signature generated using the private key of the group administrator peer node A 104A (Group-X Token ($Sig_{PvK-A}$)).

With the group created and the group token stored in the peer-to-peer overlay network, the group administrator peer node A 104A can generate a peer-specific group certificate for each member of the group 410, and can send the respective peer-specific group certificate to each member peer node 412. For example, a peer-specific group certificate (e.g., Group-X_Cert$_{peer-B}$) may be generated for peer node B 104B at 410, and then sent to the peer node B 104B at 412. The peer-specific group certificate (Group-X_Cert$_{peer-B}$) can include the group name (Group-X), the group administrator peer node A's 104A identity (Peer-A ID), and the receiving peer node's identity (Peer-B ID). According to at least some implementations, the peer-specific group certificate (Group-X_Cert$_{peer-B}$) may also include the receiving peer node's public key (PbK-B). The group administrator peer node A 104A also signs the peer-specific group certificate using its private key ($Sig_{PvK-A}$). For example, the peer-specific group certificate can be signed using a signature scheme such as an RSA signature, elliptic curve signature, or other known algorithms. Although FIG. 4A shows the signature by the private key ($Sig_{PvK-A}$) as comprising a signature of the entire peer-specific group certificate (Group-X_Cert$_{peer-B}$), in other implementations the signature ($Sig_{PvK-A}$) can comprise a signature of any one or more of the individual data pieces included in the peer-specific group certificate (Group-X_Cert$_{peer-B}$) Peer node B 104B can receive and store the peer-specific group certificate for future use in identifying itself as a member of group X at 414.

Turning to FIG. 4B, when the group member peer node B 104B desires to access some data object that requires group membership, another peer node in the peer-to-peer overlay network may be employed to validate the group member peer node's membership in the group. In the example shown in FIG. 4, peer node C 104C is employed as the validating peer node. The validating peer node C 104C may be the same peer node storing the data object that group member peer node B 104B is requesting to access, or the validating peer node C 104C may be another peer node in the network. In order to validate the group member peer node B's 104B group membership, the group member peer node B 104B can send the peer-specific group certificate (Group-X_Cert$_{peer-B}$) to the validating peer node C 104C.

Employing information from the peer-specific group certificate (Group-X_Cert$_{peer-B}$), the validating peer node C 104C can authenticate that peer node B 104B is a valid member of group X. For instance, the validating peer node C 104C can verify that the group member peer node B 104B is the rightful owner of the peer-specific group certificate (Group-X_Cert$_{peer-B}$) and that the certificate was rightfully issued by the group administrator peer node A 104A.

As shown in FIG. 4B, the validating peer node C 104C can obtain a digital signature corresponding to a piece of data signed using the group member peer node B's 104B private key to verify the group member peer node B 104B is in possession of the private key corresponding to either the public key in the peer-specific group certificate or to the public key associated with the peer node B identity (Peer-B ID) included in the peer-specific group certificate. For example, the validating peer node C 104C can send 418 a random challenge to the group member peer node B 104B. Using its private key, the group member peer node B 104B can sign the random challenge and send the signed random challenge ($Sig_{PvK-B}$(Random Challenge)) to the validating peer node C 104C at step 420. The validating peer node C 104C can then use the peer-specific public key (PbK-B) included in the peer-specific group certificate (Group-X_Cert$_{peer-B}$) to validate the signed response 421.

In other implementations, the validating peer node C 104C can obtain the peer-specific public key (PbK-B) from the peer-to-peer overlay network using the identity of the group member peer node B 104B (Peer-B ID) from the peer-specific group certificate. For example, the validating peer node C 104C can use the identity Peer-B ID from the group certificate to obtain the public key directly from the group member peer node B 104B. In other implementations, the validating peer node C 104C can use the identity Peer-B ID to obtain the node certificate for peer node B 104B, which includes its public key as noted above, and which also provides further trust since it is issued and signed by the trusted authority.

The validating peer node C 104C can also verify that the group administrator peer node A 104A is truly the group administrator, as well as the signature of the peer-specific group certificate to verify that the certificate was signed by the group administrator peer node A 104A. For example, the validating peer node C 104C can obtain 422 the node certificate for the group administrator peer node A 104A (Node Cert-A), which can be authenticated from the signature by the trusted authority ($Sig_{PvK-TA}$). In at least one example, the validating peer node C 104C can use the group administrator peer node's identity (Peer-A ID) from the peer-specific group certificate (Group-X_Cert$_{peer-B}$) to retrieve the node certificate (Node Cert-A) for the group administrator peer node 104A. In at least another example in which the identity of the group administrator may not be included in the peer-specific group certificate, the validating peer node C 104C can use the group name (Group-X) to obtain the group token from the peer-to-peer overlay network to discover the identity of the group administrator.

If the validating peer node C 104C has not already accessed the group token, it may be retrieved from the peer-to-peer overlay network 424, and the group administrator peer node A's 104A public key (PbK-A) from the node certificate (Node Cert-A) can be used to verify the signature of the group token to verify that the peer node A 104A is the group administrator and authorized the issue and/or sign the peer-specific group certificate 426. Using the public key (PbK-A) from the group administrator peer node A's 104A node certificate (Node Cert-A), the validating peer node C 104C can also verify the signature ($Sig_{PvK-A}$) included with the peer-specific group certificate (Group-X_Cert$_{peer-B}$) 428.

If the validating peer node C 104C successfully verifies that the group member peer node B 104B is the rightful owner of the peer-specific group certificate (Group-X_Cert$_{peer-B}$) and that the certificate was rightfully issued by the group administrator peer node A 104A, then the group member peer node B's 104B group membership is verified 430, and the validating peer node C 104C can grant access to the requested data object 432. If any of the verification steps fails, the group membership of the group member peer node B 104B is not established and access to the data object may be denied.

According to at least some implementations, the validating peer node C 104C can cache the group administrator peer node A's 104A identity (Peer-A ID) and public key (PbK-A), together with the group name for future verification of other members of the same group. In the implementation described with reference to FIG. 4, both group membership management and peer-specific certificate issuance are performed by the group administrator peer node. The trusted authority is, therefore, not involved in the group management process, but is involved in providing an additional layer of trust by issuing node certificates to the various peer nodes, which can be used the verify public keys and identities, as noted herein.

Figure 5A:
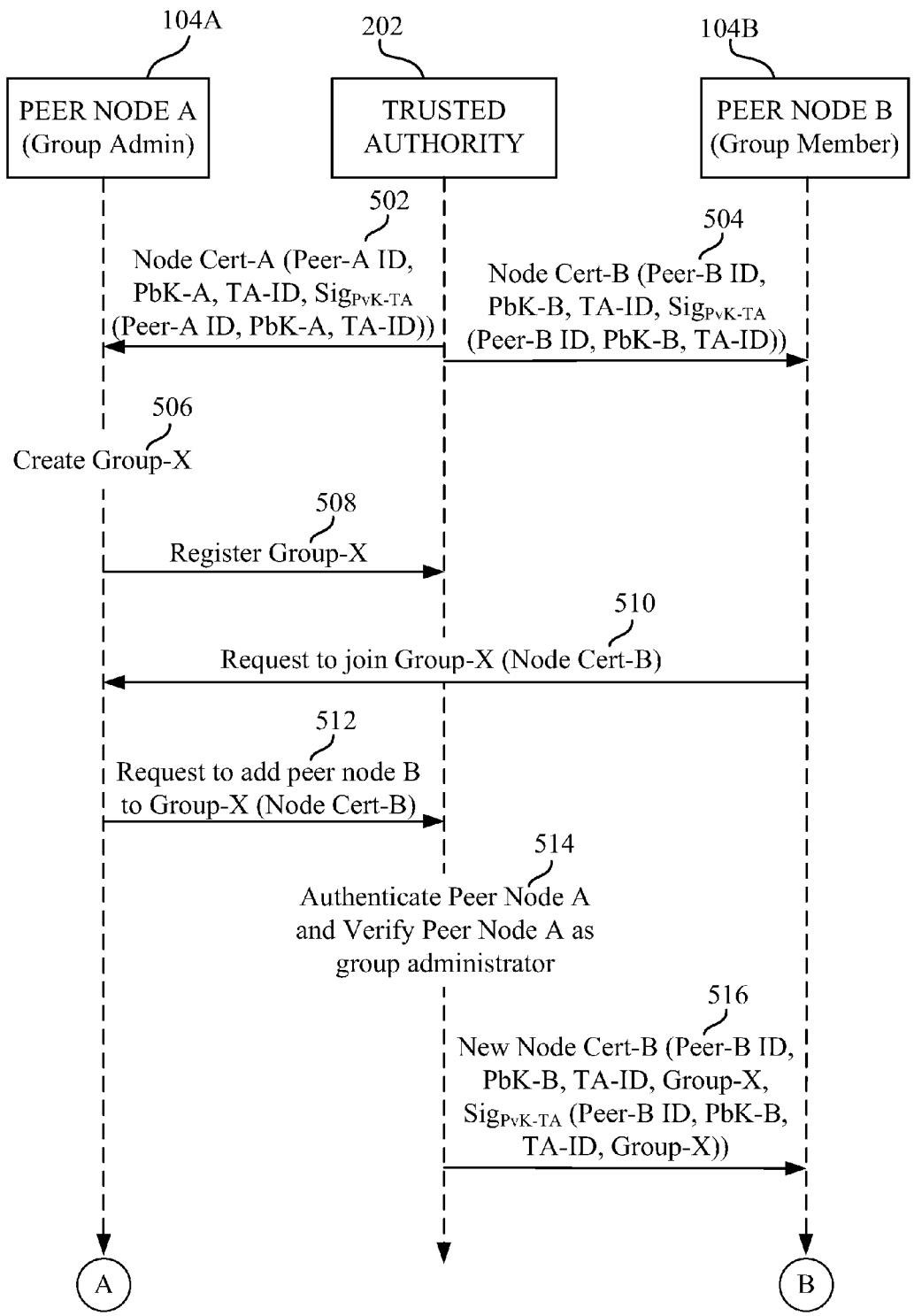
FIG. 5 (comprising FIGS. 5A and 5B) is a flow diagram illustrating group management and member authentication according to at least one implementation employing peer-specific node certificates for group-member peer nodes.
Figure 5B:
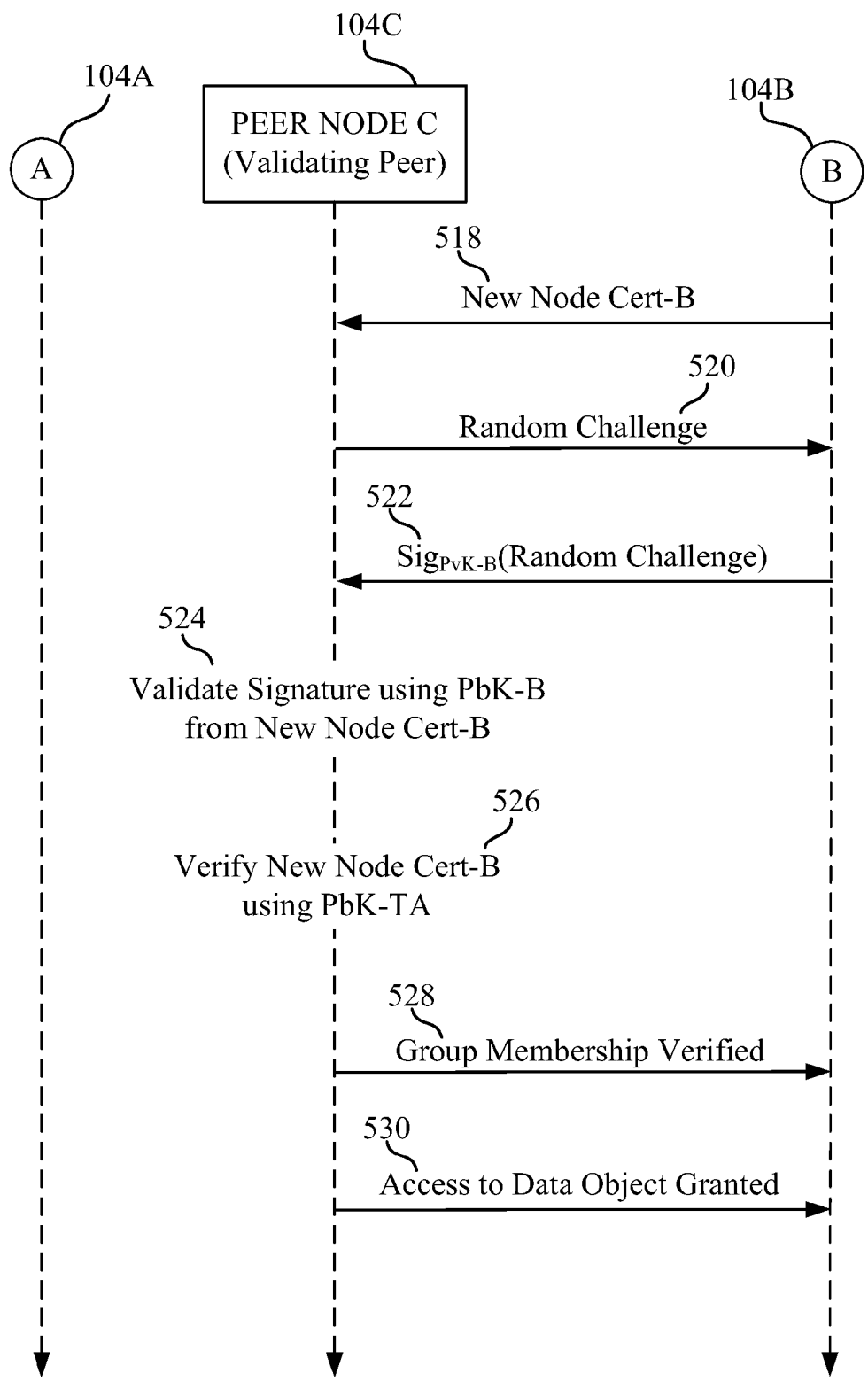

Turning now to FIG. 5 (including FIGS. 5A and 5B), a flow diagram is shown illustrating group management and member authentication according to at least one implementation employing peer-specific node certificates for group-member peer nodes. In this example, the trusted authority is responsible for issuing peer-specific certificates to group members, while enforcement of group access control is still distributed among all the peer nodes of the peer-to-peer overlay network. As illustrated, the group administrator peer node A 104A, the group member peer node B 104B, and the validating peer node C 104C described with reference to FIG. 1, as well as the trusted authority 202 described with reference to FIG. 2 are used for illustration purposes. In the implementation shown in FIG. 5, instead of generating the peer-specific certificate itself, the group administrator peer node A 104A communicates with the trusted authority 202, which generates a peer-specific node certificate for each group member.

Referring initially to FIG. 5A, the group administrator peer node A 104A can obtain a node certificate (Node Cert-A) 502, and the peer node B 104B can obtain a node certificate (Node Cert-B) 504 from the trusted authority 202. The node certificate for peer node A includes the peer node A's identity (Peer-A ID), peer node A's public key (PbK-A), the trusted authority's identity (TA-ID), and a signature by the trusted authority 202 ($Sig_{TA}$). Similarly, the node certificate for peer node B includes the peer node B's identity (Peer-B ID), peer node B's public key (PbK-B), the trusted authority's identity (TA-ID), and a signature by the trusted authority 202 ($Sig_{TA}$). The respective node certificates can be obtained in a manner similar to that described above with reference to FIG. 2.

At 506, the peer node A 104A can create a group and give the group a name (e.g., group X). The group name is a unique name used to identify the group. In this example, the group administrator peer node A 104A registers 508 the group under the group name with the trusted authority 202. The uniqueness of the group name is checked and ensured by the trusted authority 202. The trusted authority 202 can maintain a record of all group names and the identity of the group administrator for each group. In some implementations, registration of the group with the trusted authority 202 may be used in conjunction with storing a group token on the peer-to-peer overlay network as well, in which case the trusted authority 202 can verify uniqueness of the group name by verifying the information stored on the overlay, as described above with reference to FIG. 4.

When a peer node or its user desires to join a group, a request can be sent to the group administrator. For example, if peer node B 104B wishes to join group-X, a request 510 to join group-X can be sent to group administrator peer node A 104A. The request to join group-X includes the node certificate (Node Cert-B) for peer node B 104B. The group administrator peer node A 104A can approve or deny the request. If the request to join group-X is approved, the group administrator peer node A 104A assigns a peer-specific certificate for the peer node B 104B. For example, the group administrator peer node A 104A can assign the peer-specific certificate by sending a request 512 to the trusted authority 202 asking the trusted authority 202 to add peer node B 104B as a member of the group-X and to issue a peer-specific node certificate to peer node B 104B. The request to add peer node B 104B may include forwarding the node certificate (Node Cert-B) for peer node B 104B to the trusted authority 202.

On receipt of the request from the group administrator peer node A 104A, the trusted authority 202 authenticates the node identity (Peer-A ID) for the group administrator peer node A 104A, and verifies that the node identity (Peer-A ID) matches the group administrator's identity in its group record 514. If the verification is successful, the trusted authority 202 issues 516 a new node certificate (New Node Cert-B) to the peer node B 104B. The new node certificate includes all the information that was in the old certificate (Node Cert-B) plus the group name that the peer recently joined. For instance, the new node certificate (New Node Cert-B) includes the peer node B's identity (Peer-B ID), peer node B's public key (PbK-B), the trusted authority's identity (TA-ID), and a signature by the trusted authority 202 ($Sig_{TA}$), as well as the group name (Group-X) to indicate that peer node B 104B is a member of the group Group-X. The new node certificate (New Node Cert-B) may be sent to the peer node B 104B either directly from the trusted authority 202, or via the group administrator peer node A 104A. As used herein, a new node certificate indicating group membership may also be referred to as a peer-specific node certificate.

Turning to FIG. 5B, when the peer node B 104B desires to access some data object that requires membership in a group (e.g., Group-X), another peer node in the peer-to-peer overlay network may be employed to validate the group member peer node's membership in the group. In the example shown in FIG. 5, peer node C 104C is employed as the validating peer node. It is noted for clarification that the trusted authority 202 shown in FIG. 5A is not shown in FIG. 5B, while peer node A 104A and peer node B 104B are illustrated as continuing onto FIG. 5B. A circled 'A' and a circled 'B' are shown to depict that the peer node A 104A and peer node B 104B continue from FIG. 5A onto FIG. 5B. Also of note, the peer node C 104C is illustrated in FIG. 5B, which was not illustrated in FIG. 5A.

As noted, the validating peer node C 104C shown in FIG. 5B is employed to validate that the group member peer node B 104B is a member of the group. The validating peer node C 104C may be the same peer node storing the data object that group member peer node B 104B is requesting to access, or the validating peer node C 104C may be another peer node in the network. In order to validate the group membership of the group member peer node B 104B, the group member peer node B 104B can send 518 its peer-specific node certificate (New Node Cert-B) to the validating peer node C 104C.

Employing information from the peer-specific node certificate (New Node Cert-B), the validating peer node C 104C can authenticate that group member peer node B 104B is a valid member of group X. For instance, the validating peer node C 104C can verify that the group member peer node B 104B is the rightful owner of the peer-specific node certificate (New Node Cert-B) and that the certificate was truly issued by the trusted authority 202.

To verify that the group member peer node B 104B is the rightful owner of the peer-specific node certificate (New Node Cert-B), the validating peer node C 104C can obtain a digital signature corresponding to a piece of data signed using the private key of the group member peer node B 104B. The validating peer node C 104C can use the digital signature to verify that the group member peer node B 104B is in possession of the private key corresponding to the public key in the peer-specific node certificate (New Node Cert-B). For example, the validating peer node C 104C can send a random challenge 520 to the group member peer node B 104B. Using its private key, the group member peer node B 104B can sign the random challenge and send the signed random challenge ($Sig_{PvK-B}$(Random Challenge)) to the validating peer node C 104C at step 522. The validating peer node C 104C can then use the peer-specific public key (PbK-B) to validate the signed response 524. If the response is validated, the validating peer node C 104C is ensured that the group member peer node B 104B is in possession of the private key associated with the peer-specific node certificate (New Node Cert-B).

The validating peer node C 104C can also verify the signature of the peer-specific node certificate (New Node Cert-B) to verify that the certificate was issued by the trusted authority 202. For example, the validating peer node C 104C can retrieve the public key (PbK-TA) for the trusted authority 202. In some instances, the validating peer node C 104C may already have a copy of the trusted authority's public key (PbK-TA), or the validating peer node C 104C can use the identity of the trusted authority 202 (Peer-A ID) included in the peer-specific node certificate (New Node Cert-B) to retrieve the trusted authority's public key (PbK-TA). Using the public key (PbK-TA) for the trusted authority 202, the validating peer node C 104C can verify the signature ($Sig_{TA}$) included with the peer-specific node certificate (New Node Cert-B) 526.

If the validating peer node C 104C successfully verifies that the group member peer node B 104B is the rightful owner of the peer-specific node certificate (New Node Cert-B) and that the certificate was rightfully issued by the trusted authority 202, then the group member peer node B's 104B group membership is verified 528, and the validating peer node C 104C can grant access to the requested data object 530. If any of the verification steps fails, the group membership of the group member peer node B 104B is not established and access to the data object may be denied.

Exemplary Group Administrator Peer Nodes

Figure 6:
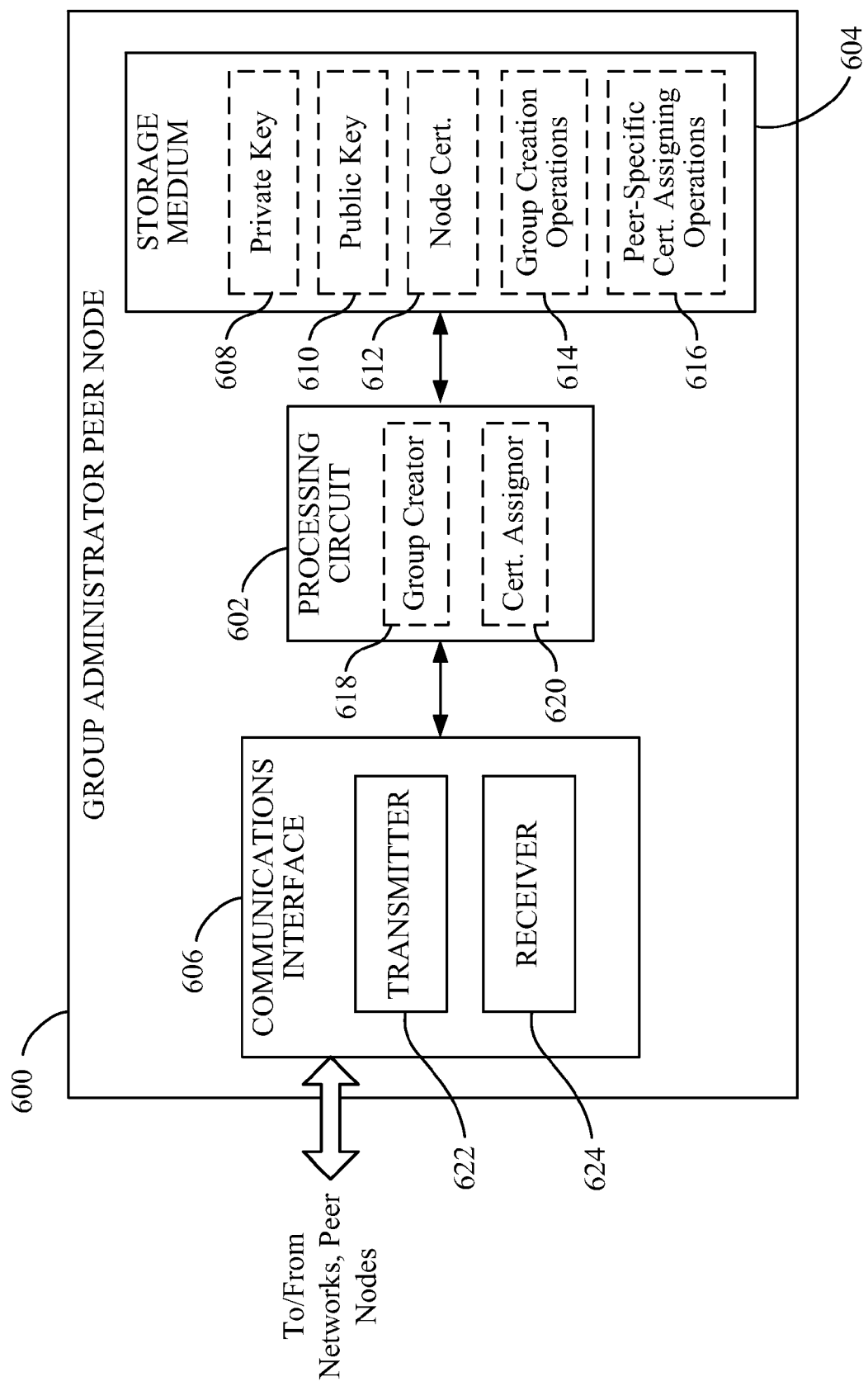
FIG. 6 is a block diagram illustrating select components of a peer node employed as a group administrator according to at least one implementation.

FIG. 6 is a block diagram illustrating select components of a peer node 600 employed as a group administrator according to at least one implementation. The group administrator peer node 600 may also be referred to herein as a group owner peer node. The peer node 600 may include a processing circuit 602 coupled to a storage medium 604 and to a communications interface 606.

The processing circuit 602 is generally arranged to obtain, process and/or send data, control data access and storage, issue commands, and control other desired operations, and may comprise circuitry configured to implement desired programming provided by appropriate media, such as storage medium 604, in at least one embodiment.

The storage medium 604 may represent one or more devices for storing programming and/or data, such as processor executable code or instructions (e.g., software, firmware), electronic data, databases, or other digital information. The storage medium 604 may be coupled to the processing circuit 602 such that the processing circuit 602 can read information from, and write information to, the storage medium 604. In the alternative, the storage medium 604 may be integral to the processing circuit 602.

The storage medium 604 of the group administrator peer node 600 can include a private key 608, a public key 610 and a node certificate 612 stored therein. The private key 608 is employed to sign data communicated by the group administrator peer node 600 using a conventional signature algorithm, and is typically known only to the group administrator peer node 600 (i.e., is not communicated to other peer nodes). The public key 610 is distributed to other peer nodes and serves to verify data signed with the private key 608.

The storage medium 604 may additionally include group creation operations 614 and peer-specific certificate assigning operations 616 stored therein. The group creation operations 614 may be implemented by the processing circuit 602 in, for example, a group creator module 618, to create a group. The peer-specific certificate assigning operations 616 may be implemented by the processing circuit 602 in, for example, a certificate assignor module 620, to assign peer-specific certificates to each member of a created group. In some implementations, the peer-specific certificate assigning operations 616 may be adapted to generate a peer-specific group certificate for each group member. In other implementations, the peer-specific certificate assigning operations 616 may be adapted to request a trusted authority to issue a peer-specific node certificate to each group member.

The communications interface 606 is configured to facilitate wireless and/or wired communications of the peer node 600. For example, the communications interface 606 may be configured to communicate information bi-directionally with respect to other peer nodes in a peer-to-peer overlay network. The communications interface 606 may be coupled with an antenna and may include wireless transceiver circuitry, including at least one transmitter 622 and/or at least one receiver 624 (e.g., one or more transmitter/receiver chains) for wireless communications with the peer-to-peer overlay network, and/or may include as a network interface card (NIC), a serial or parallel connection, a Universal Serial Bus (USB) interface, a Firewire interface, a Thunderbolt interface, or any other suitable arrangement for communicating with respect to public and/or private networks.

According to one or more features of the peer node 600 implemented as a group administrator, the processing circuit 602 may be adapted to perform any or all of the processes, functions, steps and/or routines related to the various group administrator peer nodes as described herein above with reference to FIGS. 3-5 (e.g., group administrator peer node 104A). As used herein, the term "adapted" in relation to the processing circuit 602 may refer to the processing circuit 602 being one or more of configured, employed, implemented, or programmed to perform a particular process, function, step and/or routine according to various features.

Figure 7:
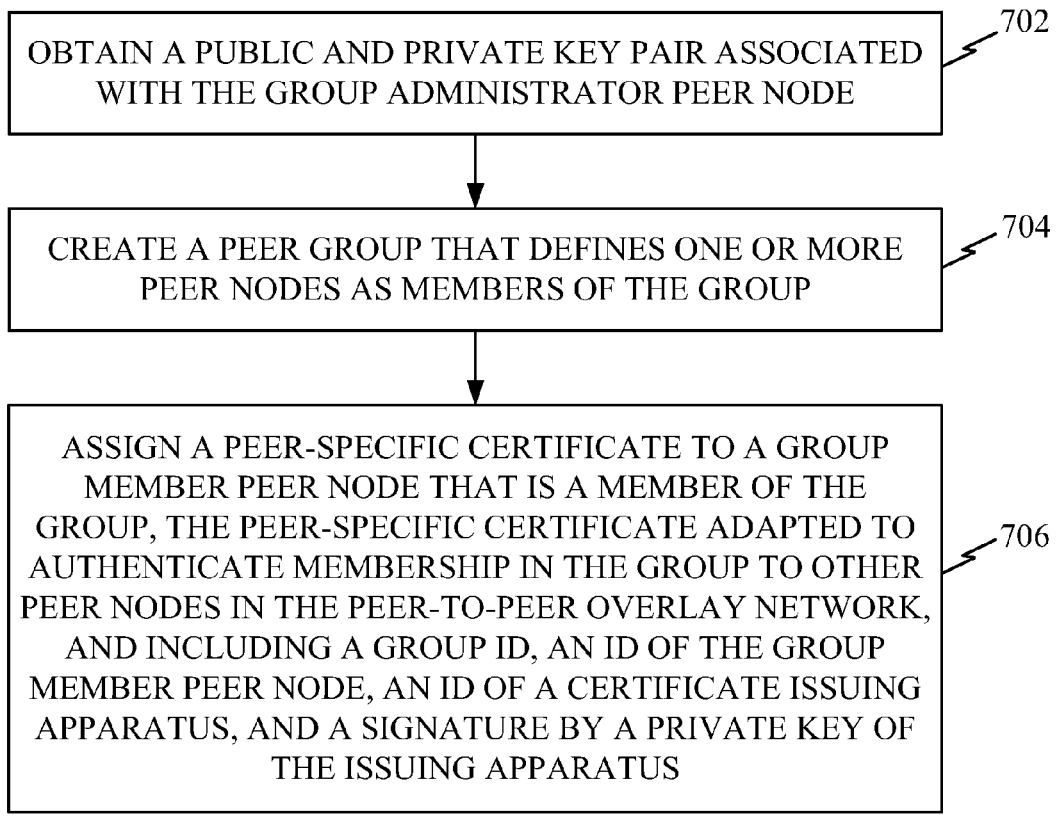
FIG. 7 is a flow diagram illustrating an example of at least one implementation of a method operational on a group administrator peer node for facilitating group membership authentication in a peer-to-peer overlay network.

FIG. 7 is a flow diagram illustrating an example of at least one implementation of a method operational on a peer node, such as the group administrator peer node 600. With reference to both of FIGS. 6 and 7, a peer node may obtain a public and private key pair at step 702. For example, the peer node 600 may obtain a public key 610 and a private key 608. As noted above, the public key 610 can be distributed to other peer nodes and can serve to verify data signed with the private key 608. The private key 608, on the other hand, may be known only to the peer node 600. In at least some implementations, the private and public key pair may be obtained by provisioning the peer node 600 with such keys, e.g., by the manufacturer, or the keys may be generated by the peer node 600 using conventional key generation techniques and algorithms.

At step 704, a peer group can be created, where the group defines one or more peer nodes that are members of the group. As noted above, reference to one or more member peer nodes may refer to peer nodes and/or users. As an example, the processing circuit 602 may employ the group creation operations 614 from the storage medium to create a group. The group can be created, for example, by a group creator module 618 of the processing circuit 602 by selecting a group name and by defining one or more peer nodes as members of the group. In some implementations, the processing circuit 602 may also generate a group token as part of the group creation operations 614, where the group token is stored by the peer node 600 as a data object in the peer-to-peer overlay network that is identified by the group identity. That is, the group token can be stored as a data object in the peer-to-peer overlay network under the name of the group. The group token is adapted to authenticate to other peer nodes in the peer-to-peer overlay network (e.g., a validating peer node) that the group administrator peer node 600 is authorized to issue the peer-specific group certificate to the group member peer node.

The group administrator peer node may then assign a peer-specific certificate to a group member peer node (e.g., the group member peer node 104B in FIGS. 3-5) that is a member of the group 706. The peer-specific certificate is adapted to indicate membership in the group and generally may include the group identity, the group member peer node's identity, an identity of an issuing apparatus, and a signature by a private key of the issuing apparatus over one or more components of the peer-specific certificate. In some implementations, the peer-specific certificate may also include a public key of the group member peer node. According to at least one example, the processing circuit 602 may be adapted to implement (e.g., in the certificate assignor module 620) the peer-specific certificate assigning operations 616 in the storage medium 604 to assign the peer-specific certificate to a group member peer node.

In at least one implementation, the peer-specific certificate assigning operations 616 may include instructions adapted to cause the processing circuit 602 (e.g., the certificate assignor module 620) to assign the peer-specific certificate by generating a peer-specific group certificate for the group member peer node. The peer-specific group certificate generated at the processing circuit 602 may include the group identity, the group member peer node's identity, the group administrator peer node's identity, and a signature by the private key 608 of the group administrator peer node 600 over one or more components of the peer-specific group certificate. The peer-specific group certificate can also include the public key of the group member peer node in some implementations. By way of example, the signature by the private key 608 may be performed by the processing circuit 602 employing a conventional signature scheme, such as an RSA signature algorithm or an elliptic curve signature algorithm, etc. In such implementations, the peer-specific certificate assigning operations 616 may further include instructions adapted to cause the processing circuit 602 to send the peer-specific group certificate to the group member peer node via the communications interface 606.

In at least another implementation, the peer-specific certificate assigning operations 616 may include instructions adapted to cause the processing circuit 602 (e.g., the certificate assignor module 620) to assign the peer-specific certificate by sending, via the communications interface 606, a request to a trusted authority to issue a peer-specific node certificate to the group member peer node. The peer-specific node certificate issued by the trusted authority may include the group identity, the group member peer node's identity, the trusted authority's identity, and a signature by a private key of the trusted authority over one or more components of the peer-specific node certificate. The peer-specific node certificate may also include the group member peer node's public key.

The group member peer node that is assigned the peer-specific certificate can subsequently be authenticated by a validating peer node (e.g., the validating peer node 104C of FIGS. 3-5) by verifying the group member peer node using the group member peer node's public key that is either included in the peer-specific certificate or obtained from the peer-to-peer overlay network using the group member peer node's identity, and by verifying the peer-specific certificate using a public key associated with the identity of the issuing apparatus in the peer-specific certificate (e.g., using the public key 610 or the trusted authority's public key).

Exemplary Group Member Peer Nodes (i.e., Accessing Peer Nodes)

Figure 8:
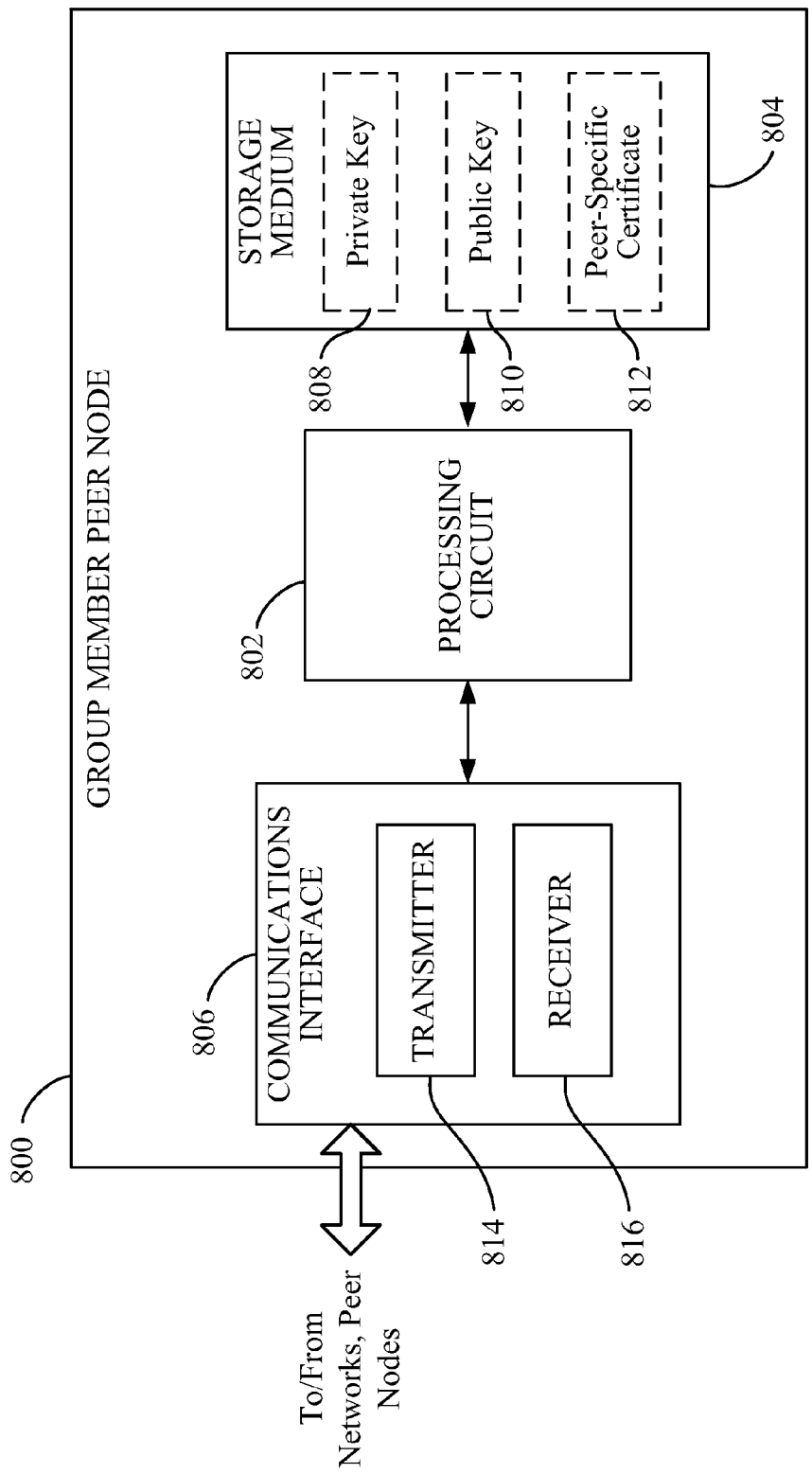
FIG. 8 is a block diagram illustrating select components of a peer node employed as a group member intending to access a data object according to at least one implementation.

FIG. 8 is a block diagram illustrating select components of a peer node 800 employed as a group member intending to access a data object according to at least one implementation. The group member peer node 800 may also be referred to herein as an accessing peer node 800. The peer node 800 may include a processing circuit 802 coupled to a storage medium 804 and to a communications interface 804.

The processing circuit 802 is generally arranged to obtain, process and/or send data, control data access and storage, issue commands, and control other desired operations, and may comprise circuitry configured to implement desired programming provided by appropriate media, such as storage medium 804, in at least one embodiment.

The storage medium 804 may represent one or more devices for storing programming and/or data, such as processor executable code or instructions (e.g., software, firmware), electronic data, databases, or other digital information. The storage medium 804 may be coupled to the processing circuit 802 such that the processing circuit 802 can read information from, and write information to, the storage medium 804. In the alternative, the storage medium 804 may be integral to the processing circuit 802.

The storage medium 804 of the group member peer node 800 can include a private key 808 and a public key 810 stored therein. The private key 808 is employed to sign data communicated by the group member peer node 800 and is typically known only to the group member peer node 800 (i.e., is not communicated to other peer nodes). The public key 810 is distributed to other peer nodes and serves to verify data signed with the private key 808.

The storage medium 804 also includes a peer-specific certificate 812 stored therein. According to various implementations, the peer-specific certificate 812 can comprise a peer-specific group certificate or a peer-specific node certificate (i.e., new node certificate).

The communications interface 806 is configured to facilitate wireless and/or wired communications of the group member peer node 800. For example, the communications interface 806 may be configured to communicate information bi-directionally with respect to other peer nodes in a peer-to-peer overlay network. The communications interface 806 may be coupled with an antenna and may include wireless transceiver circuitry, including at least one transmitter 814 and/or at least one receiver 816 (e.g., one or more transmitter/receiver chains) for wireless communications with the peer-to-peer overlay network, and/or may include as a network interface card (NIC), a serial or parallel connection, a Universal Serial Bus (USB) interface, a Firewire interface, a Thunderbolt interface, or any other suitable arrangement for communicating with respect to public and/or private networks.

According to one or more features of the group member peer node 800, the processing circuit 802 may be adapted to perform any or all of the processes, functions, steps and/or routines related to the various group member peer nodes as described herein above with reference to FIGS. 3-5 (e.g., group member peer node 104B). As used herein, the term "adapted" in relation to the processing circuit 802 may refer to the processing circuit 802 being one or more of configured, employed, implemented, or programmed to perform a particular process, function, step and/or routine according to various features.

Figure 9:
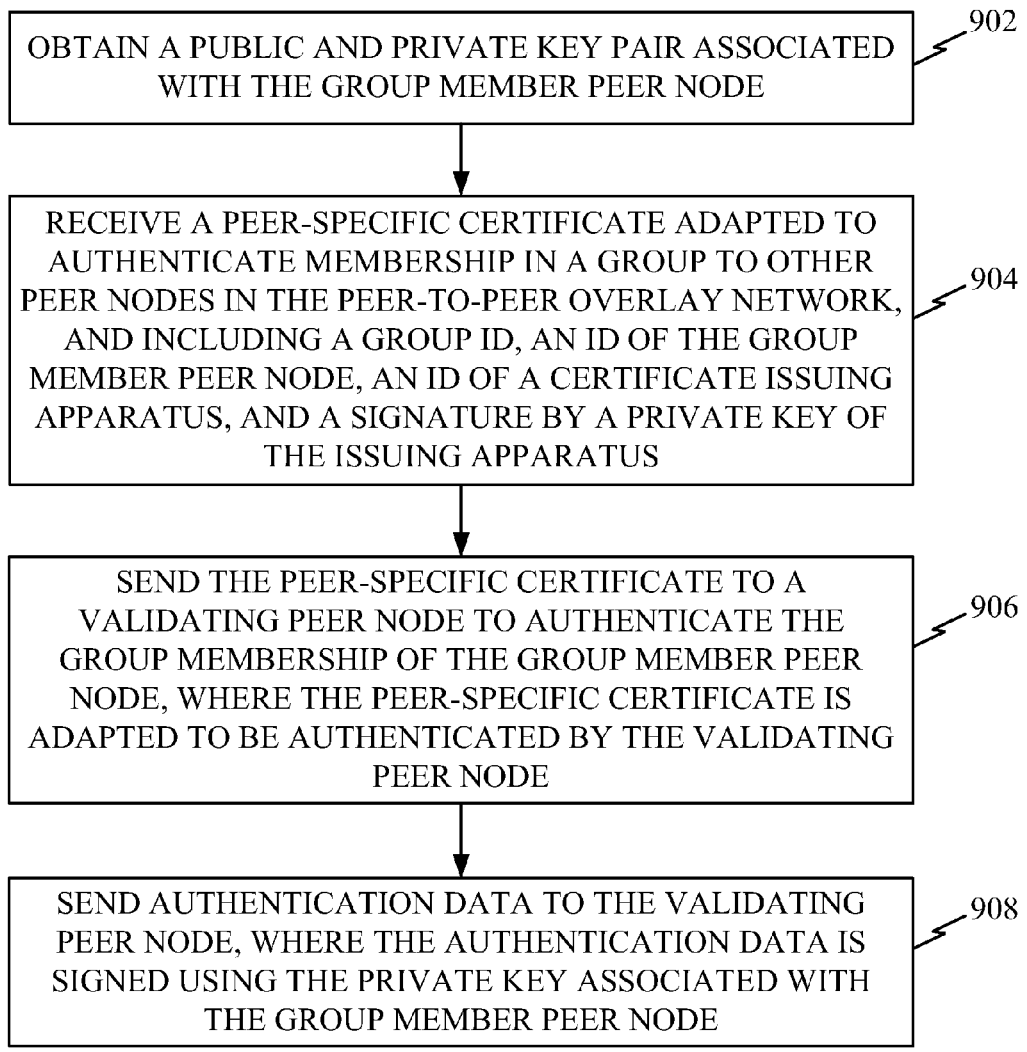
FIG. 9 is a flow diagram illustrating an example of at least one implementation of a method operational on a group member peer node for facilitating group membership authentication in a peer-to-peer overlay network.

FIG. 9 is a flow diagram illustrating an example of at least one implementation of a method operational on a peer node, such as the group member peer node 800. With reference to both of FIGS. 8 and 9, a peer node may obtain a public and private key pair at step 902. For example, the peer node 800 may obtain the public key 810 and the private key 808. As noted above, the public key 810 can be distributed to other peer nodes and can serve to verify data signed with the private key 808 using a conventional signature algorithm. The private key 808, on the other hand, may be known only to the peer node 800. In at least some implementations, the private and public key pair associated with the group member peer node 800 may be obtained by provisioning the peer node 800 with such keys, e.g., by the manufacturer, or the keys may be generated by the peer node 800 using conventional key generation techniques and algorithms.

At step 904, a peer-specific certificate can be received by the peer node 800. For example, the processing circuit 802 may receive the peer-specific certificate 812 via the communications interface 806. The peer-specific certificate 812 is adapted to indicate membership in a group to other peer nodes in the peer-to-peer overlay network (e.g., a validating peer node). The peer-specific certificate 812 may generally include a group identity, an identity of the group member peer node 800, an identity of an issuing apparatus, and a signature by a private key of the issuing apparatus over one or more components of the peer-specific certificate 812. The peer-specific certificate 812 may further include the public key 810. In some implementations, the peer-specific certificate 812 may be received in response to a request sent from the peer node 800 to a group administrator peer node.

In at least one implementation, the peer-specific certificate 812 may comprise a peer-specific group certificate issued from a group administrator peer node. Such a peer-specific group certificate may include the group identity, the identity of the group member peer node 800, an identity of the group administrator peer node, and a signature by a private key of the group administrator peer node over one or more components of the peer-specific group certificate. The peer-specific group certificate can also include the public key 810. In implementations in which the peer-specific certificate 812 comprises a peer-specific group certificate, the group identity included in the peer-specific group certificate can be adapted to locate a group token stored in the peer-to-peer overlay network as a data object identified by the group identity. As noted herein, the group token can be adapted to authenticate the group administrator peer node was authorized to issue and sign the peer-specific group certificate.

In another implementation, the peer-specific certificate 812 may comprise a peer-specific node certificate (or new node certificate) issued from a trusted authority. Such a peer-specific node certificate (or new node certificate) may include the group identity, the identity of the group member peer node 800, the identity of a trusted authority that issued the peer-specific node certificate, and a signature by a private key of the trusted authority over one or more components of the peer-specific node certificate. The peer-specific node certificate may also include the public key 810. In implementations employing a peer-specific node certificate (or new node certificate), the peer-specific node certificate (or new node certificate) may replace a previously received node certificate that may be stored in the storage medium 804 of the peer node 800.

The peer node 800 can subsequently employ the peer-specific certificate to authenticate itself as a member of the group. Accordingly, at step 906, the group member peer node 800 may send the peer-specific certificate to a validating peer node (e.g., validating peer node 104C in FIGS. 3-5) to authenticate itself as a group member. For example, the processing circuit 802 may send a transmission via the communications interface 806 to the validating peer node, where the transmission includes the peer-specific certificate 812 (e.g., the peer-specific group certificate or the peer-specific node certificate).

At step 908, the peer node 800 may send authentication data to the validating peer node, which authentication data is signed using the private key 808. For example, the processing circuit 802 may sign the authentication data using a conventional signature scheme, such as an RSA signature algorithm or an elliptic curve signature algorithm, etc. The signed authentication data may be sent by the processing circuit 802 to the validating peer node via the communications interface 806.

The group membership of peer node 800 can be authenticated by the validating peer node by verifying the peer node 800 using the public key 810 obtained from either the peer-specific certificate or the peer-to-peer network to validate the signed authentication data. In addition, the validating peer node can verify the peer-specific certificate 812 sent by the peer node 800 by employing a public key associated with the identity of the issuing apparatus, which identity is included in the peer-specific certificate 812 (e.g., using the public key of the group administrator peer node, or the trusted authority's public key).

Exemplary Validating Peer Nodes

Figure 10:
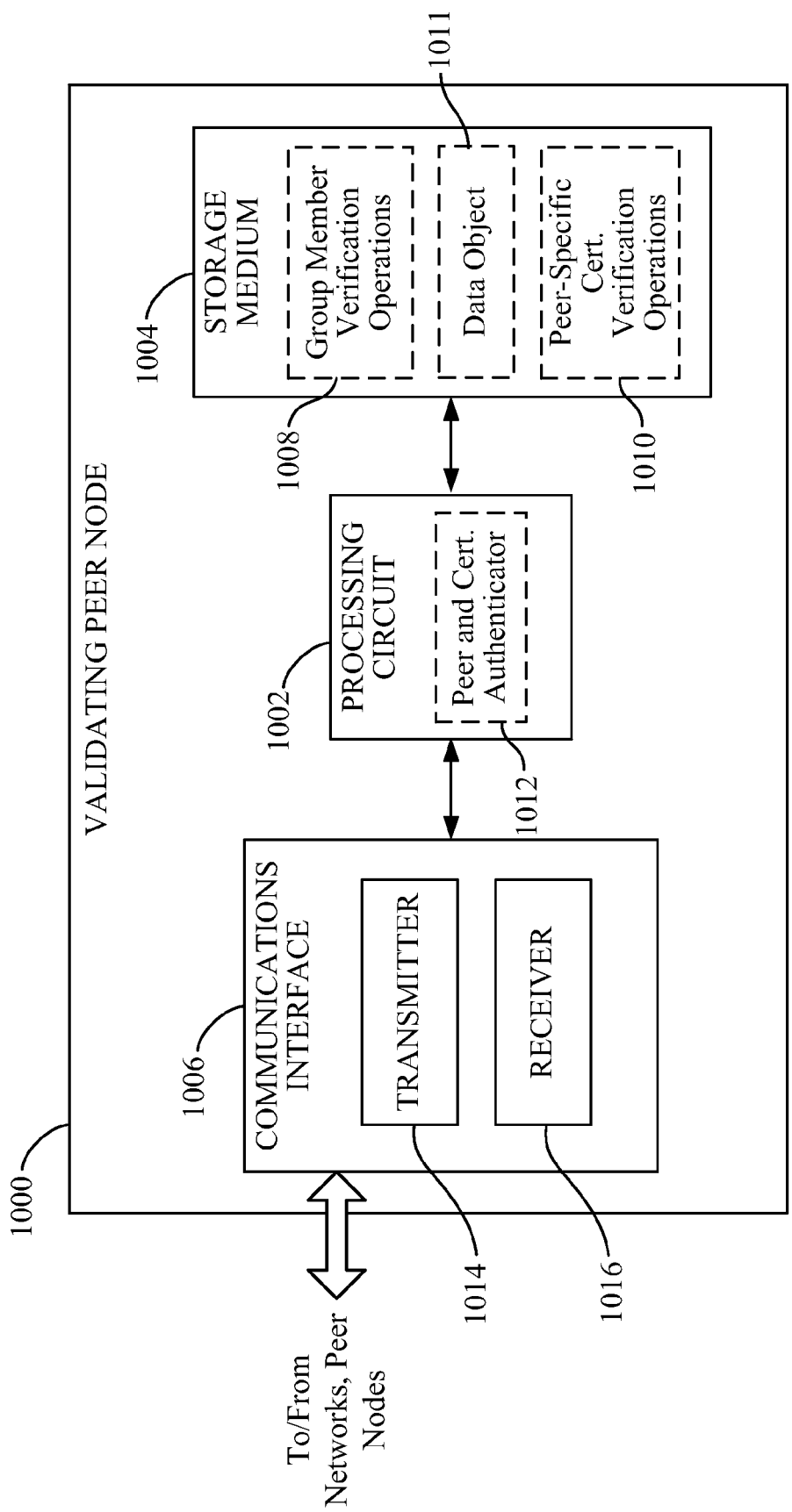
FIG. 10 is a block diagram illustrating select components of a peer node employed to validate group membership of another peer node according to at least one implementation.

FIG. 10 is a block diagram illustrating select components of a peer node 1000 employed to validate group membership of another peer node according to at least one implementation. The validating peer node 1000 may include a processing circuit 1002 coupled to a storage medium 1004 and to a communications interface 1006.

The processing circuit 1002 is generally arranged to obtain, process and/or send data, control data access and storage, issue commands, and control other desired operations, and may comprise circuitry configured to implement desired programming provided by appropriate media, such as storage medium 1004, in at least one embodiment.

The storage medium 1004 may represent one or more devices for storing programming and/or data, such as processor executable code or instructions (e.g., software, firmware), electronic data, databases, or other digital information. The storage medium 1004 may be coupled to the processing circuit 1002 such that the processing circuit 1002 can read information from, and write information to, the storage medium 1004. In the alternative, the storage medium 1004 may be integral to the processing circuit 1002.

The storage medium 1004 may include group member verification operations 1008 and peer-specific certificate verification operations 1010 stored therein. Both the group member verification operations 1008 and the peer-specific certificate verification operations 1010 may be implemented by the processing circuit 1002 in, for example, a peer and certificate authenticator module 1012, to validate group membership of a group member peer node (e.g., group member peer node 104B in FIGS. 3-5). In at least some implementations, the storage medium 1004 may include a data object 1011 of the peer-to-peer overlay network stored therein, and group membership validation may be in response to the group member peer node requesting access to the data object 1011 as a member of a group authorized to access the data object 1011.

The communications interface 1006 is configured to facilitate wireless and/or wired communications of the validating peer node 1000. For example, the communications interface 1006 may be configured to communicate information bi-directionally with respect to other peer nodes in a peer-to-peer overlay network. The communications interface 1006 may be coupled with an antenna and may include wireless transceiver circuitry, including at least one transmitter 1014 and/or at least one receiver 1016 (e.g., one or more transmitter/receiver chains) for wireless communications with the peer-to-peer overlay network, and/or may include as a network interface card (NIC), a serial or parallel connection, a Universal Serial Bus (USB) interface, a Firewire interface, a Thunderbolt interface, or any other suitable arrangement for communicating with respect to public and/or private networks.

According to one or more features of the validating peer node 1000, the processing circuit 1002 may be adapted to perform any or all of the processes, functions, steps and/or routines related to the various validating peer nodes as described herein above with reference to FIGS. 3-5 (e.g., validating peer node 104C). As used herein, the term "adapted" in relation to the processing circuit 1002 may refer to the processing circuit 1002 being one or more of configured, employed, implemented, or programmed to perform a particular process, function, step and/or routine according to various features.

Figure 11:
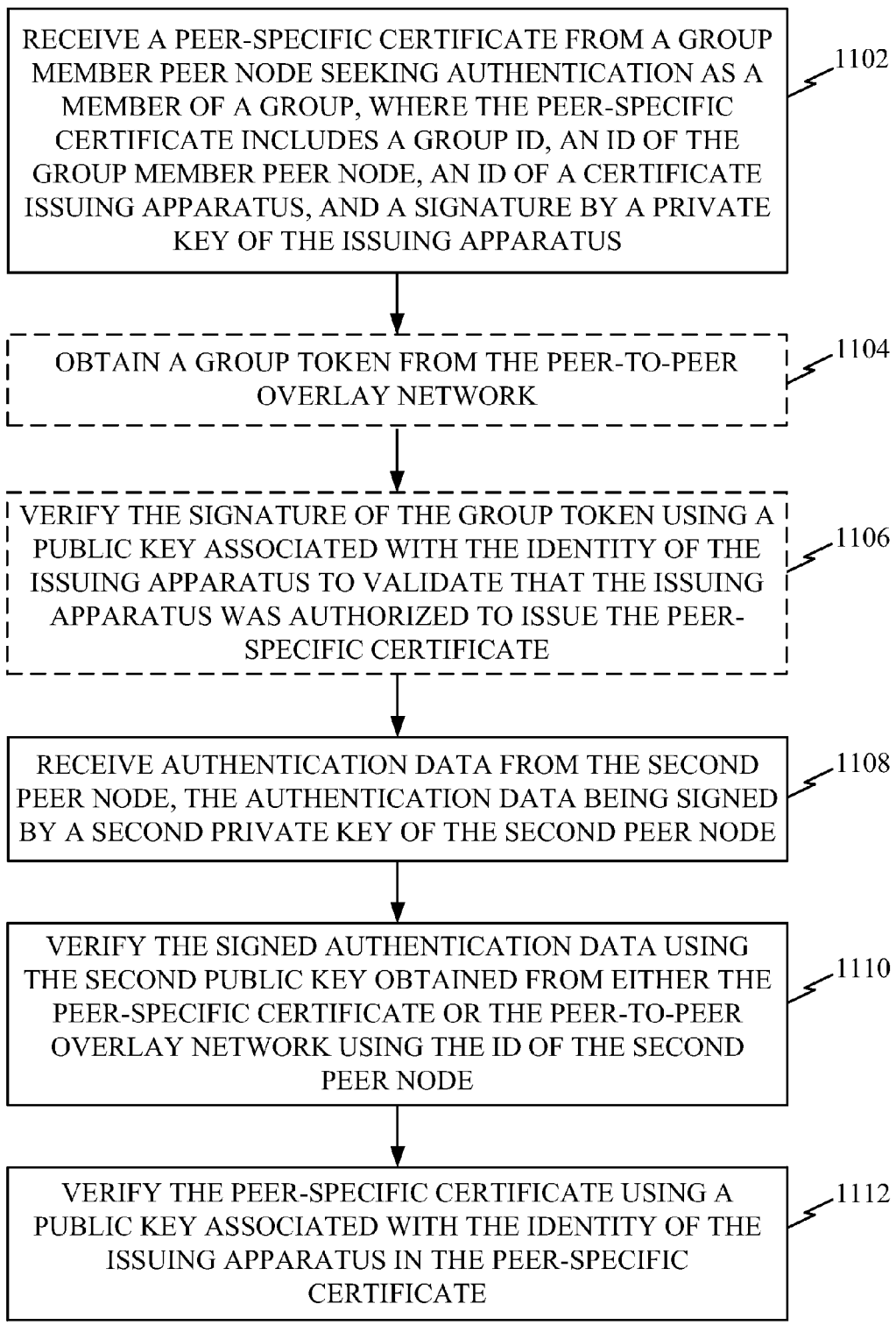
FIG. 11 is a flow diagram illustrating an example of at least one implementation of a method operational on a validating peer node for facilitating group membership authentication in a peer-to-peer overlay network.

FIG. 11 is a flow diagram illustrating an example of at least one implementation of a method operational on a peer node, such as the validating peer node 1000, for facilitating group membership authentication in a peer-to-peer overlay network. With reference to both of FIGS. 10 and 11, a peer node may receive a peer-specific certificate from a group member peer node that is seeking authentication as a member of a group at step 1102. For example, the processing circuit 1002 may receive, via the communications interface 1004, the peer-specific certificate from a group member peer node (e.g., group member peer node 104B in FIGS. 3-5). In general, the peer-specific certificate may include a group name, the group member peer node's identity, an identity of an issuing apparatus, and a signature by a private key of the issuing apparatus over one or more components of the peer-specific certificate. The peer-specific certificate can also include the public key of the group member peer node.

In at least one implementation, the received peer-specific certificate comprises a peer-specific group certificate issued by a group administrator peer node to the group member peer node. In this case, the peer-specific group certificate may include the group identity, the group member peer node's identity, an identity of the group administrator peer node, and a signature by a private key of the group administrator peer node over one or more components of the peer-specific group certificate. The peer-specific group certificate may optionally include the public key of the group member peer node as well.

In another implementation, the received peer-specific certificate comprises a peer-specific node certificate issued by a trusted authority. In this case, the peer-specific node certificate may include the group identity, the group member peer node's identity, an identity of the trusted authority, and a signature by a private key of the trusted authority over one or more components of the peer-specific node certificate. The peer-specific node certificate may optionally include the public key of the group member peer node as well.

At step 1108 (note that steps 1104 and 1106 are discussed below), the validating peer node 1000 can receive authentication data from the group member peer node, where the authentication data is signed by a private key of the group member peer node. For example, the processing circuit 1002 may receive a transmission via the communications interface 1004 including the authentication data that is signed by the private key of the group member peer node.

On receipt of the signed authentication data, the validating peer node 1000 can verify the signature of the authentication data using the public key associated with the group member peer node, at step 1110. The public key associated with the group member peer node may be obtained from either the peer-specific certificate, if included therein, or from the peer-to-peer overlay network using the identity of the group member peer node included with the peer-specific certificate. For example, the group member peer node's identity can be used to obtain the group member peer node's node certificate that includes the public key associated with the group member peer node, and which is additionally trustworthy as a result of the node certificate being issued and signed by the trusted authority. For instance, the processing circuit 1002 (e.g., the peer and certificate authenticator module 1012) can employ the group member verification operations 1008 to verify the signature with the group member peer node's public key from the peer-specific certificate. According to various implementations, the group member verification operations 1008 may be adapted to employ a conventional signature algorithm to verify the signature, such as an RSA signature algorithm, an elliptic curve signature algorithm, or any other known signature algorithm.

The validating peer node 1000 can also verify the peer-specific certificate, at step 1112, using a public key associated with the identity of the issuing apparatus that is found in the peer-specific certificate. For example, the processing circuit 1002 can retrieve a public key associated with the identity of the issuing apparatus (e.g., the public key of the group administrator peer node, or the trusted authority's public key) using the issuing apparatus's identity included in the peer-specific certificate. With the issuing apparatus's public key, the processing circuit 1002 (e.g., the peer and certificate authenticator module 1012) can employ the peer-specific certificate verification operations 1010 to verify the signature included with the peer-specific certificate. According to various implementations, the peer-specific certificate verification operations 1010 may be adapted to use a conventional signature algorithm, such as an RSA signature algorithm, an elliptic curve signature algorithm, or any other known signature algorithm to verify the signature.

In implementations employing a peer-specific group certificate, the validating peer node 1000 may obtain a group token from the peer-to-peer overlay network, as illustrated in optional step 1104. For example, the processing circuit 1002 may employ the group identity in the peer-specific group certificate to obtain the group token stored as a data object identified by the group identity within the peer-to-peer overlay network. As noted previously, the group token includes a signature by the private key of the group administrator peer node. Accordingly, the validating peer node 1000 can verify the signature of the group token using the public key of the group administrator peer node to validate that the group administrator peer node is the group administrator and/or was authorized to issue the peer-specific group certificate, as illustrated in optional step 1106.

Furthermore, in implementations employing the peer-specific group certificate, the validating peer node (e.g., the processing circuit 1002) can retrieve the public key of the group administrator peer node by obtaining a node certificate of the group administrator peer node from the peer-to-peer overlay network. As noted herein, the node certificate for a peer node includes the public key for its respective peer node and is signed by the trusted authority.

Although the group administrator peer node and the trusted authority have been described herein as separate devices, it should be noted that the role of group administrator and trusted authority may be entirely logical. Accordingly, in at least some implementations, the group administrator and the trusted authority may comprise two pieces of code residing on the same physical device. In such implementations, the communication and authentication between the group administrator and the trusted authority can be simplified and can rely on a programming API (Application Programming Interface).

Furthermore, the group concept in this disclosure can be mapped to services in a peer-to-peer overlay network, where each service provider can function as a group administrator and where there may be one or multiple trusted authorities to serve for all service providers. In such implementations, the service provider may require a fee from each peer node before joining a group. A trusted authority can also be operated by a business entity that has certain business agreement(s) with each service provider.

One or more of the components, steps, features and/or functions illustrated in FIGS. 1, 2, 3, 4, 5, 6, 7, 8, 9, 10 and/or 11 may be rearranged and/or combined into a single component, step, feature or function or embodied in several components, steps, or functions. Additional elements, components, steps, and/or functions may also be added without departing from the scope of the present disclosure. The apparatus, devices and/or components illustrated in FIGS. 1, 3, 6, 8 and/or 10 may be configured to perform one or more of the methods, features, or steps described in FIGS. 2, 4, 5, 7, 9 and/or 11. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various processing circuits 602, 802 and 1002 described herein are generally arranged to obtain, process and/or send data, control data access and storage, issue commands, and control other desired operations. Such processing circuits may comprise circuitry configured to implement desired programming provided by appropriate media, such as a storage medium (e.g., storage medium 604, 804, 1004), in at least one embodiment. For example, a processing circuit may be implemented as one or more of a processor, a controller, a plurality of processors and/or other structure configured to execute executable instructions including, for example, software and/or firmware instructions, and/or hardware circuitry. Embodiments of a processing circuit may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuits are for illustration and other suitable configurations within the scope of the present disclosure are also contemplated.

The various storage mediums 604, 804 and 1004 described herein may each represent one or more devices for storing programming and/or data, such as processor executable code or instructions (e.g., software, firmware), electronic data, databases, or other digital information. A storage medium may be any available media that can be accessed by a general purpose or special purpose processor. By way of example and not limitation, a storage medium may include read-only memory (e.g., ROM, EPROM, EEPROM), random access memory (RAM), magnetic disk storage mediums, optical storage mediums, flash memory devices, and/or other non-transitory computer-readable mediums for storing information.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the embodiments described herein can be implemented in different systems without departing from the scope of the disclosure. It should be noted that the foregoing embodiments are merely examples and are not to be construed as limiting the disclosure. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A group administrator peer node, comprising:
   a communications interface adapted to facilitate communication on a peer-to-peer overlay network;
   a storage medium including a private key and public key pair associated with the group administrator peer node; and
   a processing circuit coupled to the communications interface and the storage medium, the processing circuit adapted to:

create a peer group, the group defining one or more peer nodes as members of the group;

assign a peer-specific certificate to a group member peer node that is a member of the group, the peer-specific certificate adapted to authenticate membership in the group to other peer nodes in the peer-to-peer overlay network and including a group identity, an identity of the group member peer node, a public key associated with the group member peer node, an identity of an issuing apparatus and a signature by a private key of the issuing apparatus over one or more components of the peer-specific certificate; and obtain a group token adapted to authenticate to other peer nodes in the peer-to-peer overlay network that the group administrator peer node is authorized to issue the peer-specific group certificate to the group member peer node.

2. The group administrator peer node of claim 1, wherein the storage medium further includes a node certificate for the group administrator peer node issued by a trusted authority or self-signed by the group administrator peer node.

3. The group administrator peer node of claim 1, wherein the peer-specific certificate is adapted to authenticate the group membership of the group member peer node to other peer nodes in the peer-to-peer overlay network on verification of the group member peer node using a public key associated with the group member peer node, and on verification of the peer-specific certificate using a public key associated with the identity of the issuing apparatus in the peer-specific certificate.

4. The group administrator peer node of claim 1, wherein the processing circuit is further adapted to:

issue a peer-specific group certificate to the group member peer node, the peer-specific group certificate including the group identity, the identity of the group member peer node, an identity of the group administrator peer node and a signature by the private key of the group administrator peer node over one or more components of the peer-specific group certificate.

5. The group administrator peer node of claim 4, wherein the processing circuit is adapted to issue the peer-specific group certificate to the group member peer node by:

generating the peer-specific group certificate for the group member peer node; and sending the peer-specific group certificate to the group member peer node via the communications interface.

6. The group administrator peer node of claim 1, wherein the processing circuit is further adapted to:

generate the group token as a token signed with the private key of the group administrator peer node; and store the group token in the peer-to-peer overlay network as a data object identified by the group identity included in the peer-specific group certificate.

7. The group administrator peer node of claim 1, wherein the processing circuit is adapted to assign the peer-specific certificate to the group member peer node by sending a request to a trusted authority to issue a peer-specific node certificate to the group member peer node, the peer-specific node certificate including the group identity, the identity of the group member peer node, an identity of the trusted authority and a signature by a private key of the trusted authority over one or more components of the peer-specific node certificate.

8. A method operational in a group administrator peer node, comprising:

obtaining a public and private key pair associated with the group administrator peer node;

creating a peer group in a peer-to-peer overlay network, the group defining one or more peer nodes that are members of the group;

assigning a peer-specific certificate to a group member peer node that is a member of the group, the peer-specific certificate adapted to authenticate membership in the group to other peer nodes in the peer-to-peer overlay network and including a group identity, an identity of the group member peer node, a public key associated with the group member peer node, an identity of an issuing apparatus and a signature by a private key of the issuing apparatus over one or more components of the peer-specific certificate; and obtaining a group token adapted to authenticate to other peer nodes in the peer-to-peer overlay network that the group administrator peer node is authorized to issue the peer-specific group certificate to the group member peer node.

9. The method of claim 8, wherein the peer-specific certificate is adapted to authenticate the group membership of the group member peer node to other peer nodes in the peer-to-peer overlay network on verification of the group member peer node using a public key associated with the group member peer node, and on verification of the peer-specific certificate using a public key associated with the identity of the issuing apparatus in the peer-specific certificate.

10. The method of claim 8, wherein assigning the peer-specific certificate to the group member peer node comprises:

issuing a peer-specific group certificate to the group member peer node, the peer-specific group certificate including the group identity, the identity of the group member peer node, an identity of the group administrator peer node and a signature by the private key of the group administrator peer node over one or more components of the peer-specific group certificate.

11. The method of claim 10, wherein issuing the peer-specific group certificate to the group member peer node, comprises:

generating the peer-specific group certificate for the group member peer node; and sending the peer-specific group certificate to the group member peer node.

12. The method of claim 8, further comprising:

generating the group token as a token that is signed with the private key of the group administrator peer node; and storing the group token in the peer-to-peer overlay network as a data object identified by the group identity included in the peer-specific group certificate.

13. The method of claim 8, wherein assigning the peer-specific certificate to the group member peer node comprises:

sending a request to a trusted authority to issue a peer-specific node certificate to the group member peer node, the peer-specific node certificate including the group identity, the identity of the group member peer node, an identity of the trusted authority and a signature by a private key of the trusted authority over one or more components of the peer-specific node certificate.

14. A group administrator peer node, comprising:

means for obtaining a public and private key pair associated with the group administrator peer node;

means for creating a peer group in a peer-to-peer overlay network, the group defining one or more peer nodes that are members of the group;

means for assigning a peer-specific certificate to a group member peer node that is a member of the group, the peer-specific certificate adapted to authenticate membership in the group to other peer nodes in the peer-topeer overlay network and including a group identity, an identity of the group member peer node, a public key associated with the group member peer node, an identity of an issuing apparatus and a signature by a private key of the issuing apparatus over one or more components of the peer-specific certificate; and means for obtaining a group token adapted to authenticate to other peer nodes in the peer-to-peer overlay network that the group administrator peer node is authorized to issue the peer-specific group certificate to the group member peer node.

15. The group administrator peer node of claim 14, wherein the means for obtaining the group token further comprises:

means for generating the group token as a token that is signed with the private key of the group administrator peer node; and means for storing the group token in the peer-to-peer overlay network as a data object identified by the group identity included in the peer-specific certificate.

16. A processor-readable non-transitory medium comprising instructions operational on a group administrator peer node, which when executed by a processor causes the processor to:

obtain a public and private key pair associated with the group administrator peer node;

create a peer group in a peer-to-peer overlay network, the group defining one or more peer nodes that are members of the group;

assign a peer-specific certificate to a group member peer node that is a member of the group, the peer-specific certificate adapted to authenticate membership in the group to other peer nodes in the peer-to-peer overlay network and including a group identity, an identity of the group member peer node, a public key associated with the group member peer node, an identity of an issuing apparatus and a signature by a private key of the issuing apparatus over one or more components of the peer-specific certificate;

obtain a group token adapted to authenticate to other peer nodes in the peer-to-peer overlay network that the group administrator peer node is authorized to issue the peer-specific group certificate to the group member peer node.

17. The processor-readable non-transitory medium of claim 16, further comprising instructions, which when executed by the processor cause the processor to:

generate the group token as a token that is signed with the private key of the group administrator peer node; and store the group token in the peer-to-peer overlay network as a data object identified by the group identity included in the peer-specific group certificate.

18. A group member peer node, comprising:

a communications interface adapted to facilitate communication on a peer-to-peer overlay network;

a storage medium including a private key and a public key pair associated with the group member peer node; and a processing circuit coupled to the communications interface and the storage medium, the processing circuit adapted to:

receive via the communications interface a peer-specific group certificate issued to the group member peer node from a group administrator peer node, the peer-specific group certificate including a group identity, an identity of the group member peer node, an identity of the group administrator peer node and a signature by a private key of the group administrator peer node over one or more components of the peer-specific group certificate, the peer-specific group certificate including information identifying a group token adapted to authenticate that the group administrator peer node was authorized to issue the peer-specific group certificate;

send via the communications interface the peer-specific group certificate to a validating peer node to authenticate the group member peer node as a group member, wherein the peer-specific group certificate is adapted to be authenticated by the validating peer node; and send via the communications interface authentication data to the validating peer node, the authentication data being signed using the private key associated with the group member peer node.

19. The peer node of claim 18, wherein the peer-specific group certificate is adapted to be authenticated by the validating peer node by verification of the signed authentication data using the public key associated with the group member peer node, and by verification of the peer-specific group certificate using a public key associated with the group administrator peer node.

20. The peer node of claim 18, wherein the group identity in the peer-specific group certificate is adapted to locate the group token, which is stored in the peer-to-peer overlay network as a data object identified by the group identity.

21. The peer node of claim 18, wherein the processing circuit is further adapted to:

send a request for group membership to the group administrator peer node, wherein the peer-specific group certificate is issued by the group administrator peer node in response to sending the request.

22. A method operational in a group member peer node, comprising:

obtaining a public and private key pair associated with the group member peer node;

receiving a peer-specific group certificate issued to the group member peer node from a group administrator peer node, the peer-specific group certificate including a group identity, an identity of the group member peer node, an identity of the group administrator peer node and a signature by a private key of the group administrator peer node over one or more components of the peer-specific group certificate, the peer-specific group certificate including information identifying a group token adapted to authenticate that the group administrator peer node was authorized to issue the peer-specific group certificate;

sending the peer-specific group certificate to a validating peer node to authenticate the group member peer node as a group member, wherein the peer-specific group certificate is adapted to be authenticated by the validating peer node; and sending authentication data to the validating peer node, the authentication data being signed using the private key associated with the group member peer node.

23. The method of claim 22, wherein the peer-specific group certificate is adapted to be authenticated by the validating peer node by verification of the signed authentication data using the public key associated with the group member peer node, and by verification of the peer-specific certificate using a public key associated with the group administrator peer node.

24. The method of claim 22, wherein receiving the peer-specific group certificate including the group identity comprises:

receiving the peer-specific group certificate including a group identity adapted to locate the group token, which is stored in the peer-to-peer overlay network as a data object identified by the group identity.

25. The method of claim 22, further comprising:
sending a request for group membership to the group administrator peer node, wherein the peer-specific group certificate is issued by the group administrator peer node in response to sending the request.

26. A group member peer node, comprising:
means for obtaining a public and private key pair associated with the group member peer node;
means for receiving a peer-specific group certificate issued to the group member peer node from a group administrator peer node, the peer-specific group certificate including a group identity, an identity of the group member peer node, an identity of the group administrator peer node and a signature by a private key of the group administrator peer node over one or more components of the peer-specific group certificate, the peer-specific group certificate including information identifying a group token adapted to authenticate that the group administrator peer node was authorized to issue the peer-specific group certificate;
means for sending the peer-specific group certificate to a validating peer node to authenticate the group member peer node as a group member, wherein the peer-specific group certificate is adapted to be authenticated by the validating peer node; and
means for sending authentication data to the validating peer node, the authentication data being signed using the private key of the group member peer node.

27. A processor-readable non-transitory medium comprising instructions operational on a group member peer node, which when executed by a processor causes the processor to:
obtain a public and private key pair associated with the group member peer node;
receive a peer-specific group certificate issued to the group member peer node from a group administrator peer node, the peer-specific group certificate including a group identity, an identity of the group member peer node, an identity of the group administrator peer node and a signature by a private key of the group administrator peer node over one or more components of the peer-specific group certificate, the peer-specific group certificate including information identifying a group token adapted to authenticate that the group administrator peer node was authorized to issue the peer-specific group certificate;
send the peer-specific group certificate to a validating peer node to authenticate the group member peer node as a group member, wherein the peer-specific group certificate is adapted to be authenticated by the validating peer node; and
send authentication data to the validating peer node, the authentication data being signed using the private key of the group member peer node.

28. A validating peer node, comprising:
a communications interface adapted to facilitate communication on a peer-to-peer overlay network;
a processing circuit coupled to the communications interface, the processing circuit adapted to:
receive via the communications interface a peer-specific group certificate from a group member peer node seeking authentication as a member of a group, the peer-specific group certificate including a group identity, an identity of the group member peer node, an identity of a group administrator peer node and a signature by a private key of the group administrator peer node over one or more components of the peer-specific group certificate;
obtain a group token from the peer-to-peer overlay network, the group token including a signature by the private key of the group administrator peer node, wherein the group token is stored in the peer-to-peer overlay network as a data object identified by the group identity;
verify the signature of the group token using a public key associated with the group administrator peer node to validate that the group administrator peer node was authorized to issue the peer-specific group certificate; and
verify the peer-specific group certificate using the public key associated with the group administrator peer node.

29. The peer node of claim 28, wherein the processing circuit is adapted to:
obtain the public key associated with the group administrator peer node from a node certificate of the group administrator peer node, wherein the node certificate includes the public key associated with the group administrator peer node, an identity of a trusted authority and a signature by a private key of the trusted authority.

30. The peer node of claim 28, wherein the processing circuit is further adapted to:
receive via the communications interface authentication data from the group member peer node, wherein the authentication data is signed by a private key associated with the group member peer node; and
verify the signed authentication data using a public key associated with the group member peer node and obtained from the peer-specific group certificate or from the peer-to-peer overlay network using the identity of the group member peer node in the peer-specific group certificate.

31. The peer node of claim 28, further comprising:
a storage medium coupled to the processing circuit, the storage medium including a data object which the group member peer node is requesting to access as a member of the group.

32. A method operational in a validating peer node, comprising:
receiving a peer-specific group certificate from a group member peer node seeking authentication as a member of a group, the peer-specific group certificate including a group identity, an identity of the group member peer node, an identity of a group administrator peer node and a signature by a private key of the group administrator peer node over one or more components of the peer-specific group certificate;
obtaining a group token from the peer-to-peer overlay network, the group token including a signature by the private key of the group administrator peer node, wherein the group token is stored in the peer-to-peer overlay network as a data object identified by the group identity;
verifying the signature of the group token using a public key associated with the group administrator peer node to validate that the group administrator peer node was authorized to issue the peer-specific group certificate; and
verifying the peer-specific group certificate using the public key associated with the group administrator peer node.

33. The method of claim 32, further comprising:
obtaining the public key associated with the group administrator peer node from a node certificate of the group administrator peer node, wherein the node certificate of the group administrator peer node includes the public key associated with the group administrator peer node, an identity of a trusted authority and a signature by a private key of the trusted authority over one or more components of the node certificate.

34. The method of claim 32, further comprising:
receiving authentication data from the group member peer node, wherein the authentication data is signed by a private key associated with the group member peer node; and
verifying the signed authentication data using a public key associated with the group member peer node and obtained from the peer-specific group certificate or from the peer-to-peer overlay network.

35. The method of claim 32, further comprising:
receiving a request from the group member peer node to access a data object stored at the validating peer node, wherein access to the data object is restricted to group members.

36. A validating peer node, comprising:
means for receiving a peer-specific group certificate from a group member peer node seeking authentication as a member of a group, the peer-specific group certificate including a group identity, an identity of the group member peer node, an identity of a group administrator peer node and a signature by a private key of the group administrator peer node over one or more components of the peer-specific group certificate;
means for obtaining a group token from the peer-to-peer overlay network, the group token including a signature by the private key of the group administrator peer node, wherein the group token is stored in the peer-to-peer overlay network as a data object identified by the group identity;
means for verifying the signature of the group token using a public key associated with the group administrator peer node to validate that the group administrator peer node was authorized to issue the peer-specific group certificate; and
means for verifying the peer-specific group certificate using the public key associated with the group administrator peer node.

37. The validating peer node of claim 36, further comprising:
means for receiving authentication data from the group member peer node, wherein the authentication data is signed by a private key associated with the group member peer node; and
means for verifying the signed authentication data using a public key associated with the group member peer node and obtained from the peer-specific group certificate or from the peer-to-peer overlay network.

38. A processor-readable non-transitory medium comprising instructions operational on a validating peer node, which when executed by a processor causes the processor to:
receive a peer-specific group certificate from a group member peer node seeking authentication as a member of a group, the peer-specific group certificate including a group identity, an identity of the group member peer node, an identity of a group administrator peer node and a signature by a private key of the group administrator peer node over one or more components of the peer-specific group certificate;
obtain a group token from the peer-to-peer overlay network, the group token including a signature by the private key of the group administrator peer node, wherein the group token is stored in the peer-to-peer overlay network as a data object identified by the group identity;
verify the signature of the group token using a public key associated with the group administrator peer node to validate that the group administrator peer node was authorized to issue the peer-specific group certificate; and
verify the peer-specific group certificate using the public key associated with the group administrator peer node.

39. The processor-readable non-transitory medium of claim 38, further comprising instruction, which when executed by the processor, cause the processor to:
receive authentication data from the group member peer node, wherein the authentication data is signed by a private key associated with the group member peer node; and
verify the signed authentication data using a public key associated with the group member peer node and obtained from the peer-specific group certificate or from the peer-to-peer overlay network.

* * * * *